United States Patent
Wendland

(10) Patent No.: US 10,220,370 B2
(45) Date of Patent: Mar. 5, 2019

(54) SULFONIC ACID-CONTAINING POLYMERIC MATERIALS AS AMINE SORBENTS

(71) Applicant: 3M INNOVATIVE PROPERTIES COMPANY, St. Paul, MN (US)

(72) Inventor: Michael S. Wendland, North St. Paul, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 318 days.

(21) Appl. No.: 15/312,712

(22) PCT Filed: May 28, 2015

(86) PCT No.: PCT/US2015/032806
§ 371 (c)(1),
(2) Date: Nov. 21, 2016

(87) PCT Pub. No.: WO2015/191291
PCT Pub. Date: Dec. 17, 2015

(65) Prior Publication Data
US 2017/0182475 A1 Jun. 29, 2017

Related U.S. Application Data

(60) Provisional application No. 62/011,694, filed on Jun. 13, 2014.

(51) Int. Cl.
| | | |
|---|---|---|
| *B01J 39/05* | (2017.01) | |
| *B01J 20/26* | (2006.01) | |
| *C08F 8/36* | (2006.01) | |
| *C08F 12/34* | (2006.01) | |
| *C08F 212/36* | (2006.01) | |
| *B01J 39/20* | (2006.01) | |
| *B01D 53/02* | (2006.01) | |
| *B01D 53/54* | (2006.01) | |
| *B01J 39/19* | (2017.01) | |
| *B01D 53/58* | (2006.01) | |

(52) U.S. Cl.
CPC ............ *B01J 20/261* (2013.01); *B01D 53/02* (2013.01); *B01D 53/54* (2013.01); *B01J 39/05* (2017.01); *B01J 39/19* (2017.01); *B01J 39/20* (2013.01); *C08F 8/36* (2013.01); *C08F 12/34* (2013.01); *C08F 212/36* (2013.01); *B01D 53/58* (2013.01); *B01D 2253/202* (2013.01); *B01D 2253/306* (2013.01); *B01D 2253/308* (2013.01); *B01D 2253/311* (2013.01); *B01D 2257/406* (2013.01)

(58) Field of Classification Search
None
See application file for complete search history.

(56) References Cited

U.S. PATENT DOCUMENTS

| 9,296,668 B2 | 3/2016 | Wendland |
| 2012/0029233 A1 | 2/2012 | Rhee |

FOREIGN PATENT DOCUMENTS

| WO | WO 99/20691 | 4/1999 |
| WO | WO 2014/052021 | 4/2014 |
| WO | WO 2014/186094 | 11/2014 |
| WO | WO 2014/186108 | 11/2014 |
| WO | WO 2015/095110 | 6/2015 |

OTHER PUBLICATIONS

Carta, "Novel Spirobisindanes for Use as Precursors to Polymers of Intrinsic Microporosity", Organic Letters, Jul. 3, 2008, vol. 10, No. 13, pp. 2641-2643.
International Search Report for PCT International Application No. PCT/US2015/032806, dated Sep. 4, 2015, 4 pages.

*Primary Examiner* — Anita Nassiri-Motlagh
(74) *Attorney, Agent, or Firm* — Jean A. Lown

(57) ABSTRACT

A method of capturing a basic, nitrogen-containing compound is provided. The basic, nitrogen-containing compound is captured by sorption (e.g., adsorption) on a sulfonic-acid containing polymeric material. The sulfonic acid-containing polymeric material is formed from a polymerizable composition that contains a free-radically polymerizable spirobisindane monomer. Additionally, a polymeric material is provided that is a reaction product of a sulfonic acid-containing polymeric material having at least one —SO3H group and a basic, nitrogen-containing compound of formula Q. This polymeric material has at least one group of formula —SO$_3^-$(QH$^+$).

15 Claims, No Drawings

SULFONIC ACID-CONTAINING POLYMERIC MATERIALS AS AMINE SORBENTS

CROSS REFERENCE TO RELATED APPLICATIONS

This application is a national stage filing under 35 U.S.C. 371 of PCT/US2015/032806, filed May 28, 2015, which claims the benefit of U.S. Provisional Application No. 62/011,694, filed Jun. 13, 2014, the disclosure of which is incorporated by reference in its/their entirety herein.

TECHNICAL FIELD

A method of capturing basic, nitrogen-containing compounds on a sulfonic acid-containing polymeric material and the material resulting from the capture are provided.

BACKGROUND

Ammonia is a commonly used chemical and is present in many different environments. For example, ammonia is present at various manufacturing sites for use in a wide range of chemical reactions, on farms where anhydrous ammonia is used as a fertilizer or where animal excrement is present but ventilation may be inadequate, or in offices and homes from the use of ammonia-containing cleansers.

Ammonia vapors can pose a significant health risk. For example, in the United States, OSHA has set an eight hour exposure limit of 25 parts per million for ammonia vapor and NIOSH recently lowered the IDLH (immediately dangerous to life and health) level from 500 parts per million to 300 parts per million. That is, exposure to ammonia vapor at concentrations greater than 300 parts per million for 30 minutes can result in death or irreversible damage to health.

Because of both the prevalence and potential health risks of ammonia, various respiratory products have been developed to reduce exposure to this compound as well as to other volatile nitrogen-containing compounds such as amines. These respiratory products typically contain a sorbent that can capture ammonia or volatile amines, thereby removing them from the air. Activated carbons are the most commonly used sorbent. Activated carbons are microporous and are excellent sorbents for a variety of compounds such as volatile organic compounds (VOCs) through the mechanism of physisorption. Physisorbed compounds are adsorbed but do not chemically react with the surface of the activated carbons.

Unlike many volatile organic compounds, ammonia and volatile amines typically are not effectively captured by physisorption. Rather, ammonia and volatile amines are usually more effectively captured through chemisorption where the compounds chemically react with the sorbent itself or with a compound impregnated into the sorbent. Many efforts have been made to impregnate activated carbons with various materials that can react with ammonia and volatile amines. For example, activated carbon has been impregnated with various acids such as sulfuric acid and phosphoric acid.

Although impregnated activated carbons tend to be more effective than activated carbon itself as a sorbent for ammonia and volatile amines, the impregnation chemistries used can lower the adsorption capacity of the activated carbon for other volatile organic compounds (VOCs). That is, the impregnation chemistry occupies the pores of the activated carbons and reduces the surface area available for capture of other volatile organic compounds by a physisorption mechanism.

SUMMARY

A method of capturing a basic, nitrogen-containing compound is provided. The basic, nitrogen-containing compound is captured by sorption on a sulfonic-acid containing polymeric material. The sulfonic acid-containing polymeric material is formed from a polymerizable composition that contains a free-radically polymerizable spirobisindane monomer. Additionally, a polymeric material having at least one group of formula $-SO_3^-(QH^+)$ is provided. This polymeric material is the reaction product of a sulfonic acid-containing polymeric material having at least one $-SO_3H$ group and a basic, nitrogen-containing compound of formula Q.

In a first aspect, a method of capturing a nitrogen-containing compound is provided. The method includes providing a sulfonic acid-containing polymeric material having at least one $-SO_3H$ group. The sulfonic acid-containing polymeric material comprises a first reaction product of a first reaction mixture containing (i) a precursor polymeric material and (ii) a sulfonyl-containing compound. The precursor polymeric material contains a polymerized product of a polymerizable composition that includes a monomer of Formula (I).

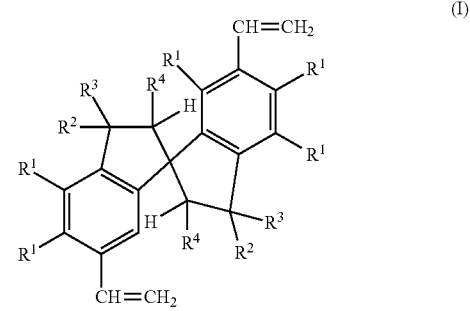

In Formula (I), each $R^1$ is hydrogen, halo, alkyl, aryl, alkaryl, or aralkyl, wherein at least one $R^1$ is hydrogen. Each $R^2$ is independently hydrogen, alkyl, aryl, alkaryl, aralkyl, combines with a $R^3$ connected to a same carbon atom to form a cyclic alkyl, or combines with a $R^3$ connected to the same carbon atom to form a cyclic alkyl that is fused to one or more carbocyclic rings. Each $R^3$ is independently hydrogen, alkyl, aryl, alkaryl, aralkyl, combines with a $R^2$ connected to a same carbon atom to form a cyclic alkyl, combines with a $R^2$ connected to the same carbon atom to form a cyclic alkyl that is fused to one or more carbocyclic rings, or combines with $R^4$ connected to an adjacent carbon atom to form a carbon-carbon bond. Each $R^4$ is independently hydrogen or combines with $R^3$ connected to the adjacent carbon atom to form a carbon-carbon bond. The method further includes sorbing a basic, nitrogen-containing compound of formula Q on the sulfonic acid-containing polymeric material to form a polymeric material having at least one group of formula $-SO_3^-(QH^+)$.

In a second aspect, a polymeric material having at least one group of formula $-SO_3^-(QH^+)$ is provided that comprises an acid-base reaction product of an acid-base reaction mixture containing (a) a sulfonic acid-containing polymeric material having at least one —SO$_3$H group and (b) a basic, nitrogen-containing compound of formula Q. The sulfonic acid-containing polymeric material comprises a first reaction product of a first reaction mixture containing (i) a precursor polymeric material and (ii) a sulfonyl-containing compound. The precursor polymeric material contains a polymerized product of a polymerizable composition that includes a monomer of Formula (I).

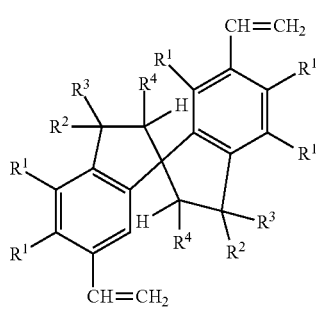

(I)

In Formula (I), each R$^1$ is hydrogen, halo, alkyl, aryl, alkaryl, or aralkyl, wherein at least one R$^1$ is hydrogen. Each R$^2$ is independently hydrogen, alkyl, aryl, alkaryl, aralkyl, combines with a R$^3$ connected to a same carbon atom to form a cyclic alkyl, or combines with a R$^3$ connected to the same carbon atom to form a cyclic alkyl that is fused to one or more carbocyclic rings. Each R$^3$ is independently hydrogen, alkyl, aryl, alkaryl, aralkyl, combines with a R$^2$ connected to a same carbon atom to form a cyclic alkyl, combines with a R$^2$ connected to the same carbon atom to form a cyclic alkyl that is fused to one or more carbocyclic rings, or combines with R$^4$ connected to an adjacent carbon atom to form a carbon-carbon bond. Each R$^4$ is independently hydrogen or combines with R$^3$ connected to the adjacent carbon atom to form a carbon-carbon bond.

DETAILED DESCRIPTION

A method is provided for capturing a basic, nitrogen-containing compound of formula Q on a sulfonic acid-containing polymeric material having at least one sulfonic acid (—SO$_3$H) group. The capture of the basic, nitrogen-containing compound results in the formation of a polymeric material having —SO$_3^-$(QH$^+$) groups. Additionally, a polymeric material having groups of formula —SO$_3^-$(QH$^+$) is provided. This polymeric material is the reaction product of a sulfonic acid-containing polymeric material having at least one —SO$_3$H group and a basic, nitrogen-containing compound of formula Q.

The terms "a", "an", and "the" are used interchangeably with "at least one" to mean one or more of the elements being described.

The term "halo" refers to a monovalent group that is a radical of a halogen atom. The halo can be fluoro, chloro, bromo, or iodo.

The term "alkyl" refers to a monovalent group that is a radical of an alkane. The alkyl group can have 1 to 20 carbon atoms. The alkyl group can be linear, branched, cyclic, or a combination thereof. When the alkyl is linear, it can have 1 to 20 carbon atoms. When the alkyl is branched or cyclic, it can have 3 to 20 carbon atoms.

The term "aryl" refers to a monovalent group that is a radical of an aromatic carbocyclic compound. The aryl group has at least one aromatic carbocyclic ring and can have 1 to 5 optional rings that are connected to or fused to the aromatic carbocyclic ring. The additional rings can be aromatic, aliphatic, or a combination thereof. The aryl group usually has 5 to 20 carbon atoms or 6 to 10 carbon atoms.

The term "alkaryl" refers to an aryl group substituted with at least one alkyl group. The alkaryl group contains 6 to 40 carbon atoms. The alkaryl group often contains an aryl group having 5 to 20 carbon atoms and an alkyl group having 1 to 20 carbon atoms.

The term "aralkyl" refers to an alkyl group substituted with at least one aryl group. The aralkyl group contains 6 to 40 carbon atoms. The aralkyl group often contains an alkyl group having 1 to 20 carbon atoms and an aryl group having 5 to 20 carbon atoms.

The term "carbocyclic group" refers to an aliphatic or aromatic carbon ring structure. The carbocyclic group can be saturated, partially unsaturated, or unsaturated. The carbocyclic group often contains 5 to 20 carbon atoms.

The term "polymer" refers to both polymeric materials prepared from one monomer such as a homopolymer or to polymeric materials prepared from two or more monomers such as a copolymer, terpolymer, or the like. Likewise, the term "polymerize" refers to the process of making a polymeric material that can be a homopolymer, copolymer, terpolymer, or the like.

The term "sorb", "sorbing", and "sorption" refer to adsorbing a compound, absorbing a compound, or both adsorbing and absorbing a compound on a surface of a sorbent. The term "sorbent" refers to a material that is capable of sorbing a compound by adsorption, absorption, or both. The sorption mechanism can be based on chemisorption, physisorption, or both.

The term "mircopores" refers to pores having a diameter less than 2 nanometers.

The term "mesopores" refers to pores having a diameter in a range of 2 to 50 nanometers.

The term "macropores" refers to pores having a diameter greater than 50 nanometers.

In a first aspect, a method of capturing a nitrogen-containing compound is provided. The method includes providing a sulfonic acid-containing polymeric material having at least one —SO$_3$H group. The sulfonic acid-containing polymeric material comprises a first reaction product of a first reaction mixture containing (i) a precursor polymeric material and (ii) a sulfonyl-containing compound. The precursor polymeric material contains a polymerized product of a polymerizable composition that includes a free-radically polymerizable spirobisindane monomer. The method further includes sorbing a basic, nitrogen-containing compound of formula Q on the sulfonic acid-containing polymeric material to form a polymeric material having at least one group of formula —SO$_3^-$(QH$^+$). The nitrogen-containing compound is sorbed through an acid-base reaction and is not covalently bonded to the sulfonic acid-containing polymeric material.

The sulfonic acid-containing polymeric material is prepared by treating a precursor polymeric material with a sulfonyl-containing compound. The precursor polymeric material includes a polymerized product of a polymerizable composition containing a monomer of Formula (I).

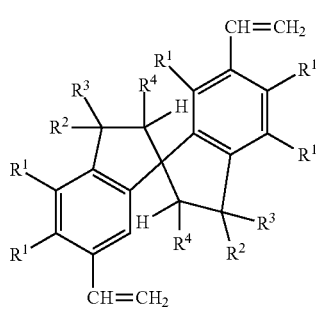

(I)

In Formula (I), each $R^1$ is hydrogen, halo, alkyl, aryl, alkaryl, or aralkyl, wherein at least one $R^1$ is hydrogen. Each $R^2$ is independently hydrogen, alkyl, aryl, alkaryl, aralkyl, combines with a $R^3$ connected to a same carbon atom to form a cyclic alkyl, or combines with a $R^3$ connected to the same carbon atom to form a cyclic alkyl that is fused to one or more carbocyclic rings. Each $R^3$ is independently hydrogen, alkyl, aryl, alkaryl, aralkyl, combines with a $R^2$ connected to a same carbon atom to form a cyclic alkyl, combines with a $R^2$ connected to the same carbon atom to form a cyclic alkyl that is fused to one or more carbocyclic rings, or combines with $R^4$ connected to an adjacent carbon atom to form a carbon-carbon bond. Each $R^4$ is independently hydrogen or combines with $R^3$ connected to the adjacent carbon atom to form a carbon-carbon bond.

Each $R^1$ in Formula (I) is hydrogen, halo, alkyl, aryl, alkaryl, or aralkyl. Suitable halo groups for $R^1$ include, but are not limited to, chloro and bromo. Suitable alkyl groups often have up to 20 carbon atoms, up to 10 carbon atoms, up to 6 carbon atoms, or up to 4 carbon atoms. For example, the alkyl groups can have 1 to 10 carbon atoms, 3 to 10 carbon atoms, 1 to 6 carbon atoms, 3 to 6 carbon atoms, or 1 to 4 carbon atoms. Suitable aryl groups often have up to 12 carbon atoms, up to 10 carbon atoms, or up to 6 carbon atoms. In many embodiments, the aryl group is phenyl. Suitable alkaryl and aralkyl groups often have an aryl group with up to 12 carbon atoms, up to 10 carbon atoms, or up to 6 carbon atoms and an alkyl group with up to 10 carbon atoms, up to 6 carbon atoms, or up to 4 carbon atoms. An example alkaryl group is phenyl substituted with one or more alkyl groups having 1 to 10 carbon atoms, 1 to 6 carbon atoms, or 1 to 4 carbon atoms. An example aralkyl group is an alkyl group having 1 to 10 carbon atoms, 1 to 6 carbon atoms, or 1 to 4 carbon atoms substituted with a phenyl.

At least one $R^1$ is hydrogen in the monomer of Formula (I). In some embodiments, there is at least one $R^1$ equal to hydrogen on each aromatic ring shown in Formula (I). That is, there are at least two $R^1$ groups equal to hydrogen in the monomer of Formula (I). This is often the position that undergoes a reaction with the sulfonyl-containing compound to introduce a sulfonic acid group (—$SO_3H$) during the formation of the sulfonic acid-containing polymeric material from the precursor polymeric material. That is, in the sulfonic acid-containing polymeric material, one of the $R^1$ groups equal to hydrogen in the precursor polymeric material prepared from the monomer of Formula (I) is replaced with a sulfonic acid group.

Each $R^2$ in Formula (I) is independently hydrogen, alkyl, aryl, alkaryl, aralkyl, combines with a $R^3$ connected to a same carbon atom to form a cyclic alkyl, or combines with a $R^3$ connected to the same carbon atom to form a cyclic alkyl that is fused to one or more carbocyclic rings. Suitable alkyl groups often have up to 20 carbon atoms, up to 10 carbon atoms, up to 6 carbon atoms, or up to 4 carbon atoms. For example, the alkyl groups can have 1 to 10 carbon atoms, 3 to 10 carbon atoms, 1 to 6 carbon atoms, 3 to 6 carbon atoms, or 1 to 4 carbon atoms. Suitable aryl groups often have up to 12 carbon atoms, up to 10 carbon atoms, or up to 6 carbon atoms. In many embodiments, the aryl group is phenyl. Suitable alkaryl and aralkyl groups often have an aryl group with up to 12 carbon atoms, up to 10 carbon atoms, or up to 6 carbon atoms and an alkyl group with up to 10 carbon atoms, up to 6 carbon atoms, or up to 4 carbon atoms. An example alkaryl group is phenyl substituted with one or more alkyl groups having 1 to 10 carbon atoms, 1 to 6 carbon atoms, or 1 to 4 carbon atoms. An example aralkyl group is an alkyl group having 1 to 10 carbon atoms, 1 to 6 carbon atoms, or 1 to 4 carbon atoms substituted with a phenyl. Suitable cyclic alkyl groups that form through the combination of $R^2$ and $R^3$ can have up to 10 carbon atoms, up to 8 carbon atoms, or up to 6 carbon atoms. In many embodiments, the cyclic alkyl group has 3 to 8 carbon atoms or 3 to 6 carbon atoms. The cyclic alkyl group can optionally be fused to one or more carbocyclic rings. Each carbocyclic ring typically has up to 10 carbon atoms, up to 8 carbon atoms, or up to 6 carbon atoms and can be aromatic (i.e., unsaturated), partially unsaturated, or saturated. The fused carbocyclic rings are often benzene rings. An example cyclic alkyl with one or more fused carbocyclic rings is fluorenyl (i.e., a monovalent radical of fluorene).

Each $R^3$ is independently hydrogen, alkyl, aryl, alkaryl, aralkyl, combines with a $R^2$ connected to a same carbon atom to form a cyclic alkyl, combines with a $R^2$ connected to the same carbon atom to form a cyclic alkyl that is fused to one or more carbocyclic rings, or combines with $R^4$ connected to adjacent carbon atom to form a carbon-carbon bond. Suitable alkyl groups often have up to 20 carbon atoms, up to 10 carbon atoms, up to 6 carbon atoms, or up to 4 carbon atoms. For example, the alkyl groups can have 1 to 10 carbon atoms, 3 to 10 carbon atoms, 1 to 6 carbon atoms, 3 to 6 carbon atoms, or 1 to 4 carbon atoms. Suitable aryl groups often have up to 12 carbon atoms, up to 10 carbon atoms, or up to 6 carbon atoms. In many embodiments, the aryl group is phenyl. Suitable alkaryl and aralkyl groups often have an aryl group with up to 12 carbon atoms, up to 10 carbon atoms, or up to 6 carbon atoms and an alkyl group with up to 10 carbon atoms, up to 6 carbon atoms, or up to 4 carbon atoms. An example alkaryl group is phenyl substituted with one or more alkyl groups having 1 to 10 carbon atoms, 1 to 6 carbon atoms, or 1 to 4 carbon atoms. An example aralkyl group is an alkyl group having 1 to 10 carbon atoms, 1 to 6 carbon atoms, or 1 to 4 carbon atoms substituted with a phenyl. Suitable cyclic alkyl groups that form through the combination of $R^2$ and $R^3$ can have up to 10 carbon atoms, up to 8 carbon atoms, or up to 6 carbon atoms. In many embodiments, the cyclic alkyl group has 3 to 8 carbon atoms or 3 to 6 carbon atoms. The cyclic alkyl group can optionally be fused to one or more carbocyclic rings. Each carbocyclic ring typically has up to 10 carbon atoms, up to 8 carbon atoms, or up to 6 carbon atoms and can be aromatic (i.e., unsaturated), partially unsaturated, or saturated. The fused carbocyclic rings are often benzene rings. An example cyclic alkyl with one or more fused carbocyclic rings is fluorenyl (i.e., a monovalent radical of fluorene).

Each $R^4$ is independently hydrogen or combines with $R^3$ connected to an adjacent carbon atom to form a carbon-carbon bond.

In some specific embodiments of the monomer of Formula (I), $R^1$ is hydrogen or halo, $R^2$ is an alkyl having 1 to 10 carbon atoms (e.g., 1 to 6 carbon atoms, 1 to 4 carbon atoms, 1 to 3 carbon atoms, or 1 carbon atom), $R^3$ is an alkyl having 1 to 10 carbon atoms (e.g., 1 to 6 carbon atoms, 1 to 4 carbon atoms, 1 to 3 carbon atoms, or 1 carbon atom), and $R^4$ is hydrogen. In other more specific embodiments of the monomer of Formula (I), each $R^1$ is hydrogen, $R^2$ is an alkyl having 1 to 6 carbon atoms (e.g., 1 to 4 carbon atoms, 1 to 3 carbon atoms, or 1 carbon atom), $R^3$ is an alkyl having 1 to 6 carbon atoms (e.g., 1 to 4 carbon atoms, 1 to 3 carbon atoms, or 1 carbon atom), and $R^4$ is hydrogen. In an even more specific embodiment of the monomer of Formula (I), each $R^1$ is hydrogen, $R^2$ is methyl, $R^3$ is methyl, and $R^4$ is hydrogen; this monomer is 3,3,3',3'-tetramethyl-1,1'-spiro-bisindan-6,6'-divinyl.

The monomers of Formula (I) can be prepared using any known method. For example, monomers can be prepared as shown in Reaction Scheme A where all of the $R^1$ and $R^4$ groups are hydrogen and where all of the $R^2$ and $R^3$ groups are alkyl or hydrogen.

A bisphenol compound of Formula (II) is reacted with methane sulfonic acid (MSA) to produce the spirobisindan-6,6'-diol compound of Formula (III). The spirobisindan-6,6'-diol can be reacted with trifluoromethane sulfonic anhydride (TFMSA) in the presence of pyridine and a solvent such as methylene chloride to produce the spirobisindan-6,6'-bistriflate compound of Formula (IV). The spirobisindan-6,6'-bistriflate compound can subsequently be subjected to a Stille coupling reaction to produce the spirobisindane-6,6'-divinyl compound of Formula (V). That is, the compound of Formula (IV) can be reacted with tributyl(vinyl) tin in the presence of lithium chloride, a palladium catalyst, and a solvent such as N,N-dimethyl formamide (DMF) to introduce polymerizable groups. The details for this synthesis approach are further described in the Example section for the preparation of the monomer 3,3,3',3'-tetramethyl-1,1'-spirobisindan-6,6'-divinyl starting from bisphenol A as the compound of Formula (II).

Monomers of Formula (I) can be prepared as shown in Reaction Scheme B where $R^3$ and $R^4$ combine to form a carbon-carbon double bond and where $R^2$ is an alkyl, aryl, alkaryl, or aralkyl.

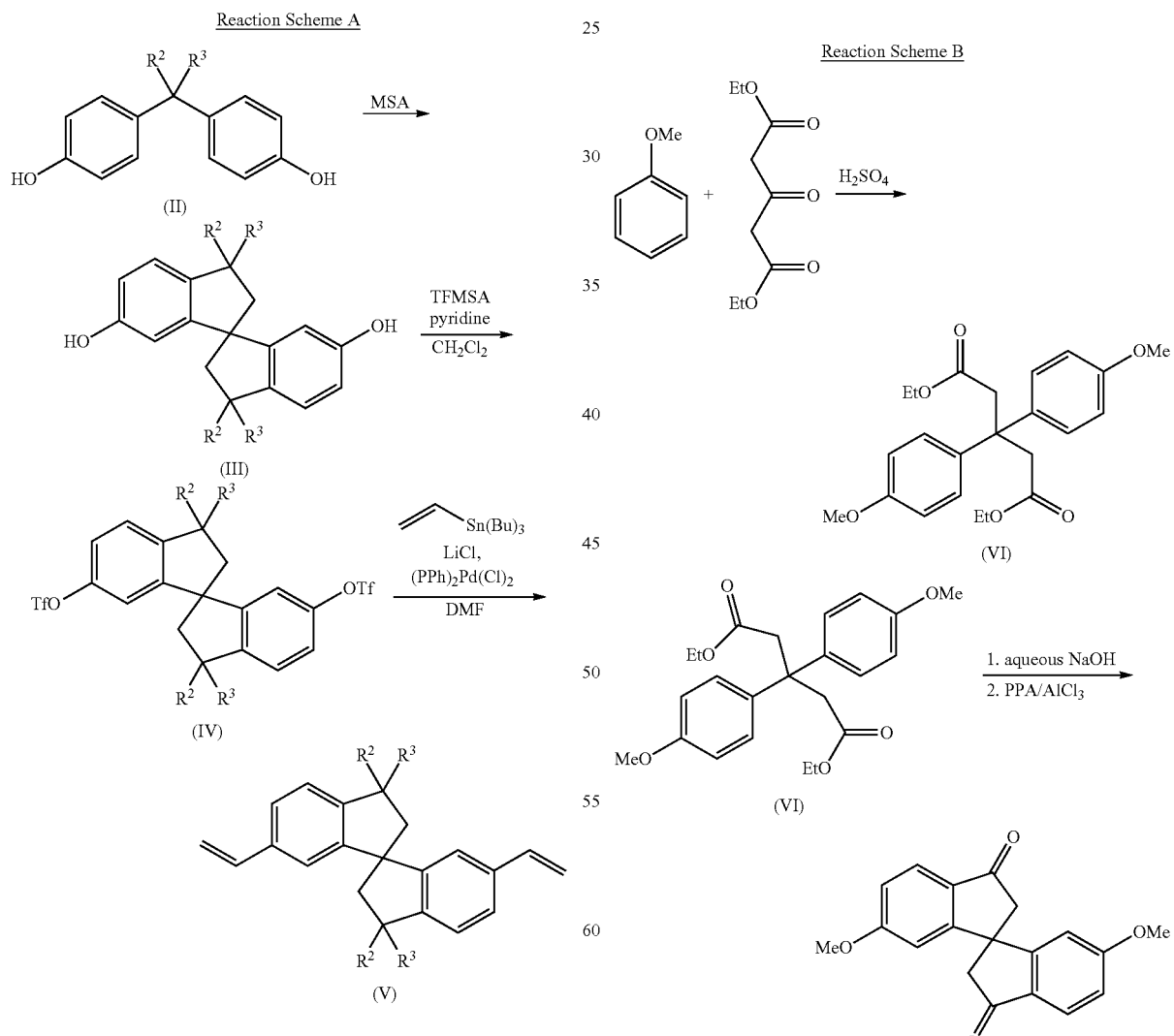

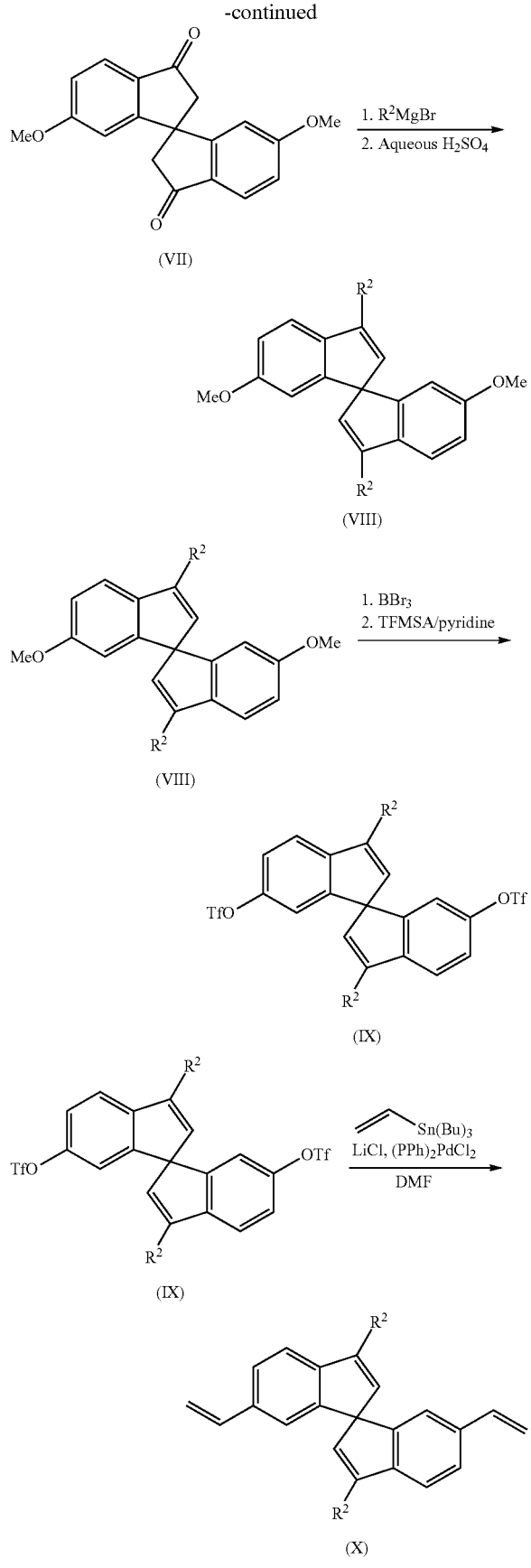

The chemistry involved in the formation of the dione (Compound (VII)) is described in Org. Left., 2008, 10, 2641. More specifically, diethyl-1,3-acetonedicarboxylate and methoxybenzene are reacted in the presence of sulfuric acid to form Compound (VI). This reaction is followed by hydrolysis and then Friedel-Crafts acylation mediated by polyphosphoric acid (PPA) and aluminum trichloride ($AlCl_3$) to form Compound (VII). Various monomers of Formula (I) can be prepared from the dione (Compound (VII)) using Grignard reactions. This type of reaction is exemplified in Reaction Scheme B using $R^2MgBr$ as the Grignard reagent. The dehydrated spirobisindane (Compound (VIII)) is formed after treatment with aqueous sulfuric acid. Compound (VIII) is reacted with boron tribromide ($BBr_3$) to convert the methoxy groups to hydroxyl groups. The hydroxyl groups are then reacted with trifluoromethane sulfonic anhydride (TFMSA) in the presence of pyridine and a solvent such as methylene chloride to produce Compound (IX) with triflate groups. The triflate groups are reacted with tributyl(vinyl) tin in the presence of lithium chloride, a palladium catalyst, and a solvent such as N,N-dimethyl formamide (DMF). This reaction, which is often referred to as a Stille coupling reaction, introduces the polymerizable groups as shown in Compound (X).

The polymerizable composition used to prepare the precursor polymeric material includes at least a monomer of Formula (I). In some embodiments, the only monomer in the polymerizable composition is of Formula (I) and the precursor polymeric material is a homopolymer. In other embodiments, the polymerizable composition includes a monomer of Formula (I) and at least one co-monomer that is not of Formula (I). Such a precursor polymeric material is a copolymer.

The co-monomers are often selected to prepare a precursor polymeric material that is porous. In some embodiments, the co-monomers include one or more polyvinyl aromatic monomers. The term "polyvinyl aromatic monomer" refers to a monomer that is not of Formula (I) and that has a plurality (e.g., two or three) of vinyl groups that are each bonded to an aromatic carbocyclic group. The aromatic carbocyclic group has at least one aromatic carbocyclic ring and can have 1 to 5 optional rings that are connected to or fused to the aromatic carbocyclic ring. The additional rings can be aromatic, aliphatic, or a combination thereof. Any of the rings optionally can be substituted with one or more alkyl groups. The aromatic carbocyclic group usually has 5 to 20 carbon atoms, 6 to 20 carbon atoms, or 6 to 10 carbon atoms. The polyvinyl aromatic monomer is often a divinyl aromatic monomer (e.g., divinylbenzene or divinylbenzene substituted with one or more alkyl groups) or a trivinyl aromatic monomer (e.g., trivinylbenzene or trivinylbenzene substituted with one or more alkyl groups).

The polymerizable compositions often contain at least 1 weight percent, at least 5 weight percent, at least 10 weight percent, at least 20 weight percent, at least 30 weight percent, at least 40 weight percent, or at least 50 weight percent of a monomer of Formula (I). For the preparation of polymeric material with micropores, the polymerizable composition often contains at least 40 weight percent, at least 50 weight percent, at least 60 weight percent, at least 70 weight percent, at least 80 weight percent, or at least 90 weight percent of the monomer of Formula (I).

In some embodiments, the polymerizable composition can include 1 to 99 weight percent of a monomer of Formula (I) and 1 to 99 weight percent of a polyvinyl aromatic monomer. For example, the polymerizable composition can contain 10 to 90 weight percent of a monomer of Formula (I) and 10 to 90 weight percent of a polyvinyl aromatic monomer, 20 to 80 weight percent of a monomer of Formula (I) and 20 to 80 weight percent of a polyvinyl aromatic monomer, 30 to 70 weight percent of a monomer of Formula (I) and 30 to 70 weight percent of a polyvinyl aromatic monomer, or 40 to 60 weight percent of a monomer of Formula (I) and 40 to 60 weight percent of a polyvinyl aromatic monomer. The weight percent is based on a total weight of monomers in the polymerizable composition.

In other embodiments, the polymerizable composition can include 50 to 99 weight percent of a monomer of Formula (I) and 1 to 50 weight percent of a polyvinyl aromatic monomer. For example, the polymerizable composition can contain 60 to 99 weight percent of a monomer of Formula (I) and 1 to 40 weight percent of a polyvinyl aromatic monomer, 70 to 99 weight percent of a monomer of Formula (I) and 1 to 30 weight percent of a polyvinyl aromatic monomer, 80 to 99 weight percent of a monomer of Formula (I) and 1 to 20 weight percent of a polyvinyl aromatic monomer, or 90 to 99 weight percent of a monomer of Formula (I) and 1 to 10 weight percent of a polyvinyl aromatic monomer. The weight percent is based on a total weight of monomers in the polymerizable composition.

Some polyvinyl aromatic monomers contain one or more mono-vinyl aromatic monomers as impurities. As used herein, the term "mono-vinyl aromatic monomer" refers to a monomer having a single vinyl group bonded to an aromatic carbocyclic group. The aromatic carbocyclic group has at least one aromatic carbocyclic ring and can have 1 to 5 optional rings that are connected to or fused to the aromatic carbocyclic ring. The additional rings can be aromatic, aliphatic, or a combination thereof. Any of the rings optionally can be substituted with one or more alkyl groups. The aromatic carbocyclic group usually has 5 to 20 carbon atoms, 6 to 20 carbon atoms, or 6 to 10 carbon atoms. Example mono-vinyl aromatic monomers include, but are not limited to, styrene, ethyl styrene, and the like.

In some embodiments, the polyvinyl aromatic monomer contains up to 25 weight percent, up to 20 weight percent, up to 15 weight percent, up to 10 weight percent, or up to 5 weight percent mono-vinyl aromatic monomer. For example, technical grade divinylbenzene typically contains about 20 weight percent ethyl styrene. The weight percent is based on a total weight of the mono-vinyl aromatic monomer and the polyvinyl aromatic monomer.

Considering impurities that may be present in the polyvinyl aromatic monomers, the polymerizable compositions often contain 1 to 99 weight percent of a monomer of Formula (I), 0 to 25 weight percent of mono-vinyl aromatic monomer, and 1 to 99 weight percent of a polyvinyl aromatic monomer. In another example, the polymerizable composition contains 1 to 98 weight percent of a monomer of Formula (I), 1 to 20 weight percent of a mono-vinyl aromatic monomer, and 1 to 98 weight percent of a polyvinyl aromatic monomer. In yet another example, the polymerizable composition contains 5 to 90 weight percent of a monomer of Formula (I), 5 to 19 weight percent of a mono-vinyl aromatic monomer, and 5 to 90 weight percent of a polyvinyl aromatic monomer. If polymeric material that is porous is desired, the amount of mono-vinyl aromatic monomer is typically selected to be less than 15 weight percent, less than 10 weight percent, or less than 5 weight percent and often additionally contains at least 50 weight percent of a monomer of Formula (I). The weight percent is based on a total weight of monomer in the polymerizable composition.

In some embodiments, a polymeric material that is microporous is desired. To prepare microporous polymeric material, the polymerizable composition often contains 40 to 99 weight percent of a monomer of Formula (I), 0 to 15 weight percent of a mono-vinyl aromatic monomer, and 1 to 60 weight percent of a polyvinyl aromatic monomer. For example, the polymerizable composition contains 50 to 99 weight percent of a monomer of Formula (I), 0 to 10 weight percent of a mono-vinyl aromatic monomer, and 1 to 50 weight percent of a polyvinyl aromatic monomer. In another example, the polymerizable composition contains 60 to 99 weight percent of a monomer of Formula (I), 0 to 10 weight percent of a mono-vinyl aromatic monomer, and 1 to 40 weight percent of a polyvinyl aromatic monomer. In yet another example, the polymerizable composition contains 70 to 99 weight percent of a monomer of Formula (I), 0 to 10 weight percent of a mono-vinyl aromatic monomer, and 1 to 30 weight percent of a polyvinyl aromatic monomer. The weight percent is based on a total weight of monomer in the polymerizable composition.

In addition to the various monomers, the polymerizable compositions typically include an initiator for free radical polymerization reactions. Any suitable free radical initiator can be used. In some embodiments, the free radical initiator is a thermal initiator that is usually activated at a temperature above room temperature. In other embodiments, the free radical initiator is a redox initiator. Suitable free radical initiators are typically selected to be miscible with the monomers included in the polymerizable composition. The free radical initiator is typically present in an amount in a range of 0.05 to 10 weight percent, in a range of 0.05 to 5 weight percent, in a range of 0.05 to 2 weight percent, in a range of 0.05 to 1 weight percent, in a range of 0.1 to 5 weight percent, in a range of 0.2 to 5 weight percent, in a range of 0.5 to 5 weight percent, in a range of 0.1 to 2 weight percent, or in a range of 0.1 to 1 weight percent. The weight percent is based on a total weight of monomer in the polymerizable composition. Both the type and amount of initiator can affect the polymerization rate, which in turn can influence the formation of porous polymeric material.

Suitable thermal initiators include, but are not limited to, organic peroxides and azo compounds. Example azo compounds include, but are not limited to, those commercially available under the trade designation VAZO from E.I. du Pont de Nemours Co. (Wilmington, Del.) such as VAZO 64 (2,2'-azobis(isobutyronitrile), which is often referred to as AIBN) and VAZO 52 (2,2'-azobis(2,4-dimethylpentanenitrile)). Other azo compounds are commercially available from Wako Chemicals USA, Inc. (Richmond, Va.) such as V-601 (dimethyl 2,2'-azobis(2-methylproprionate)), V-65 (2,2'-azobis(2,4-dimethyl valeronitrile)), and V-59 (2,2'-azobis(2-methylbutyronitrile)). Organic peroxides include, but are not limited to, bis(1-oxoaryl)peroxides such as benzoyl peroxide (BPO), bis(1-oxoalkyl)peroxides such as lauroyl peroxide, and dialkyl peroxides such as dicumyl peroxide or di-tert-butyl peroxide, and mixtures thereof. The temperature needed to activate the thermal imitator is often in a range of 25° C. to 160° C., 30° C. to 160° C., or 40° C. to 160° C.

Suitable redox initiators include arylsulfinate salts or triarylsulfonium salts in combination with a metal in an oxidized state, a peroxide, or a persulfate. Specific arylsulfinate salts include tetraalkylammonium arylsulfinates such as tetrabutylammonium 4-ethoxycarbonylbenzenesulfinate, tetrabutylammonium 4-trifluoromethylbenzenesulfinate, and tetrabutylammonium 3-trifluoromethylbenzenesulfinate. Specific triarylsulfonium salts include those with a triphenylsulfonium cation and with an anion selected from $PF_6^-$, $AsF_6^-$, and $SbF_6^-$. Suitable metal ions include, for example, ions of group III metals, transition metals, and lanthanide metals. Specific metal ions include, but are not limited to, Fe(III), Co(III), Ag(I), Ag(II), Cu(II), Ce(III), Al (III), Mo(VI), and Zn(II). Suitable peroxides include benzoyl peroxide, lauroyl peroxide, and the like. Suitable persulfates include, for example, ammonium persulfate, tetraalkylammonium persulfate (e.g., tetrabutylammonium persulfate), and the like.

The polymerizable composition typically also includes a solvent. Any suitable solvent or mixture of solvents can be selected. The one or more solvents are typically selected to be miscible with the monomers included in the polymerizable composition. Stated differently, the monomers in the polymerizable composition are typically dissolved in one or more solvents. Additionally, the selection of the one or more solvents can alter the porosity of the precursor polymeric material formed from the polymerizable composition. The porosity can often be increased by delaying the onset of phase separation of the growing polymeric chains during the polymerization process. That is, the use of solvents with good solubility for both the monomers and the growing polymeric material tends to enhance porosity. Solubility parameter calculations can be used to select a solvent or solvent mixture that is close to that of the polymeric material. Solvents that tend to enhance porosity include, but are not limited to, ethyl acetate, amyl acetate (i.e., n-pentyl acetate), and methyl ethyl ketone.

The onset of phase separation of the growing polymeric chains also can be delayed by reducing the rate of polymerization. The rate can be reduced by using a lower polymerization temperature and selecting an initiator that is activated at a lower temperature. The amount of the initiator added to the polymerizable composition can also influence the rate of reaction. That is, the reaction rate is typically increased with the addition of higher amounts of the initiator.

Additionally, the percent solids of the polymerizable composition can influence the rate of polymerization. Typically, lower percent solids tend to favor porosity. The percent solids are often in a range of 0.5 to 80 weight percent, 1 to 80 weight percent, 1 to 70 weight percent, 1 to 60 weight percent, 1 to 50 weight percent, 1 to 40 weight percent, 1 to 30 weight percent, 1 to 20 weight percent, 1 to 15 weight percent, 1 to 10 weight percent, 2 to 10 weight percent, 1 to 8 weight percent, 2 to 8 weight percent, 1 to 6 weight percent, or 2 to 6 weight percent based on a total weight of the polymerizable composition.

Other types of polymerization methods can be used, if desired, such as, for example, emulsion polymerization methods and suspension polymerization methods. If porous polymeric material is desired, the polymerizable compositions and reaction conditions can be selected using the principles discussed above.

The polymerized product, which is the precursor polymeric material, can be a monolith that can be easily broken apart for washing and for removal of any residual monomer. The washed product can be dried to form a powder. Alternatively, if suspension polymerization or emulsion polymerization methods are used, the polymerized product can be in the form of beads or particles.

The precursor polymeric material can be porous. The porosity can be characterized from adsorption isotherms obtained at various partial pressures (e.g., $10^{-6}$ to 0.98) using nitrogen or argon as the sorbate under cryogenic conditions. The total porosity can be calculated based on the total amount of nitrogen or argon adsorbed at a relative pressure close to 0.95 or higher. The total porosity is often at least 0.20 $cm^3$/gram, at least 0.30 $cm^3$/gram, at least 0.40 $cm^3$/gram, or at least 0.45 $cm^3$/gram. The total porosity can be, for example, up to 1.2 $cm^3$/gram or higher, up to 1.1 $cm^3$/gram, up to 1.0 $cm^3$/gram, up to 0.95 $cm^3$/gram, or up to 0.90 $cm^3$/gram.

The total porosity and the pore size distribution of the precursor polymeric material can be varied by choice of monomers in the polymerizable composition and the reaction conditions such as solvent selection, the percent solids of the polymerizable composition, and the polymerization rate. In many embodiments, the porous polymeric material is microporous, mesoporous, or both. Homopolymers prepared from polymerizable compositions containing a monomer of Formula (I) tend to be microporous. Depending on the specific reaction conditions, the porosity can be predominately microporous. Various polyvinyl aromatic monomers that are not of Formula (I) can be added to the polymerizable composition to prepare precursor polymeric material having both micropores and mesopores. As the amount of the polyvinyl aromatic monomer is increased relative to the monomer of Formula (I), the percentage of the total porosity attributable to micropores tends to decrease.

For some applications, precursor polymeric material having a porosity that is mainly microporous can be advantageous. Micropores tend to increase the adsorptive capacity of the sulfonyl-containing materials (e.g., increase in adsorptive capacity for volatile amines), tend to improve the kinetics of adsorption (e.g., volatile amines can be adsorbed faster or more efficiently on the sulfonyl-containing materials), or both.

The total surface area can be calculated from BET (Brunauer-Emmett, and Teller) analysis of the isotherm data for sorption of an inert gas such as argon at relative pressures less than 0.35, less than 0.30, less than 0.25, or less than 0.20. The total surface area is often at least 50 m2/gram, at least 100 $m^2$/gram, at least 200 $m^2$/gram, at least 400 $m^2$/gram, or at least 600 $m^2$/gram. The total surface area of the precursor polymeric material can be, for example, up to 1000 $m^2$/gram or higher, up to 900 $m^2$/gram, up to 850 $m^2$/gram, or up to 800 $m^2$/gram.

The precursor polymeric material is subsequently treated with a sulfonyl-containing compound. This reaction introduces at least one sulfonyl-containing group into the precursor polymeric material. The sulfonyl-containing group typically replaces a hydrogen atom that is bonded to a carbon atom that is part of an aromatic ring of the precursor polymer. For example, the sulfonyl-containing group often replaces a $R^1$ group that is equal to hydrogen in the precursor polymer. Alternatively or additionally, the sulfonyl-containing group can replace a hydrogen atom that is bonded to a carbon atom in any aryl group, in the aryl portion of any aralkyl group, or in the aryl portion of any alkaryl group in the precursor polymeric material. Further, the sulfonyl-containing group can be added to a double bond in the precursor polymeric material where groups $R^3$ and $R^4$ combine to form a carbon-carbon double bond.

The reaction product of a reaction between the precursor polymeric material and the sulfonyl-containing compound is a sulfonyl-containing polymer. If the sulfonyl-containing group is a sulfonic acid group, the sulfonyl-containing polymer is a sulfonic acid-containing polymer. If the sulfonyl-containing group is not a sulfonic acid group, the sulfonyl-containing polymer is an intermediate polymeric material that is further reacted to form the sulfonic acid-containing polymeric material. The sulfonyl-containing polymeric material has at least one aromatic ring substituted with a sulfonyl-containing group. Typically, the sulfonyl-containing polymeric material has a maximum number of sulfonyl-containing groups equal to the total number of aromatic rings. There is usually no more than one sulfonyl-containing group per aromatic ring in the sulfonyl-containing polymeric material.

In some embodiments, the precursor polymeric material is reacted with a halogenated sulfonic acid (e.g., chlorosulfonic acid) as the sulfonyl-containing compound. The precursor polymeric material is mixed with a solution of the halogenated sulfonic acid dissolved in an appropriate organic solvent. Suitable organic solvents include various halogenated solvents such as 1,2-dichloroethane, methylene chloride, and chloroform. The solution of the halogenated sulfonic acid is often added to the precursor polymeric material at a temperature below room temperature such as, for example, at about 0° C. The initial reaction can be quite exothermic so, if adequate care is not taken, the solvent can boil during the addition. After the reactants are combined, the temperature is often increased to any desired temperature such as room temperature up to the temperature associated with reflux conditions. The reaction time can range from a few minutes to 24 hours. The reaction time and the reaction temperature can be varied to prepare an intermediate, sulfonyl-containing polymeric material with different amounts of the sulfonyl-containing group. The sulfonyl-containing polymeric material has attached —$SO_2X$ groups where X is halo such as chloro. The intermediate sulfonyl-containing polymeric material with attached —$SO_2X$ group is then placed in water to convert the —$SO_2X$ groups to —$SO_3H$ groups. The conversion of the —$SO_2X$ groups to —$SO_3H$ groups often can occur at room temperature within 5 minutes, within 10 minutes, within 20 minutes, within 30 minutes, within 1 hour, within 2 hours, within 4 hours, within 8 hours, within 12 hours, within 24 hours, within 36 hours, within 48 hours, within 60 hours, or within 72 hours.

In other embodiments, the precursor polymeric material is reacted with concentrated sulfuric acid or with concentrated sulfuric acid in the presence of a catalyst such as silver sulfate. The product of this reaction is a sulfonic acid-containing polymeric material. When a catalyst is present, the reaction typically proceeds faster. With or without the catalyst, the reaction temperature is often in a range of room temperature (e.g., 20-25° C.) to 150° C., in a range of room temperature to 125° C., or in a range of room temperature to 100° C. The reaction times can vary from a few minutes (e.g., 5 minutes, 10 minutes, or 30 minutes) to 24 hours or longer. As with halogenated sulfonic acid, the reaction time and the reaction temperature can be varied to prepare polymeric materials with different amounts of the sulfonic acid group.

Typically, it is desirable to introduce as many sulfonyl-containing groups (e.g., sulfonic acid groups) as possible into the precursor polymeric material. An excess of the sulfonyl-containing compound is used. That is, the moles of sulfonyl-containing compound can be up to 10 times the number of moles of aromatic rings in the precursor polymeric material. If it is desirable to have fewer sulfonyl-containing groups, the moles of sulfonyl-containing compound can be lowered, the reaction time can be shortened, or the reaction temperature can be lowered. For example, in some embodiments, there is not a sulfonyl group on each aromatic ring and the molar ratio of sulfonyl-containing compound to aromatic rings is less than 1.

The sulfonic acid-containing polymeric material typically contains at least 0.2 milliequivalents of —$SO_3H$ per gram. In some embodiments, the amount of —$SO_3H$ is in a range of 0.2 to 7 milliequivalents per gram, in a range of 0.2 to 6 milliequivalents per gram, in a range of 0.2 to 5 milliequivalents per gram, in a range of 0.2 to 4.5 milliequivalents per gram, in a range of 0.5 to 4 milliequivalents per gram, in a range of 1 to 4 milliequivalents per gram, in a range of 2 to 4 milliequivalents per gram, or in a range of 3 to 4 milliequivalents per gram of the sulfonic acid-containing polymeric material. Any suitable method can be used to determine the milliequivalents per gram. In one preferred method, the total sulfur content of the sulfonic acid-containing polymeric material is determined by elemental analysis.

The sulfonic acid-containing polymeric material can sorb a basic, nitrogen-containing compound. That is, the sulfonic acid-containing polymeric material can be used to capture basic, nitrogen-containing compounds. The basic, nitrogen-containing compound is not covalently bonded to the sulfonic acid-containing polymeric material. Rather, the interaction between the sulfonic acid-containing polymeric material and the nitrogen-containing compound is an acid-base reaction and typically results in the formation of a salt. The basic, nitrogen-containing compound of formula Q undergoes an acid-base reaction with the sulfonic acid groups to form groups of formula —$SO_3^-(QH^+)$. For example, when the basic, nitrogen-containing compound is ammonia, at least some of the —$SO_3H$ groups on the sulfonic acid-containing polymeric material are converted to —$SO_3^-(NH_4^+)$ groups.

The basic nitrogen-containing compounds can be classified as Lewis bases, Bronsted-Lowry bases, or both. Suitable basic nitrogen-containing compounds often have a low molecular weight (e.g., no greater than 150 grams/mole). That is, the nitrogen-containing compounds can be volatile at or near room temperature or can be volatile under use conditions. Examples of nitrogen-containing compounds include, but are not limited to, ammonia, hydrazine compounds, amine compounds (e.g., alkyl amines, dialkylamines, triaalkylamines, alkanolamines, alkylene diamines, arylamines), and nitrogen-containing heterocyclic (saturated and unsaturated) compounds. Specific basic nitrogen-containing compounds include, for example, ammonia, hydrazine, methylhydrazine, methylamine, dimethylamine, trimethylamine, ethylamine, diethylamine, triethylamine, propylamine, dipropylamine, tripropylamine, isopropylamine, diisopropylamine, triisopropylamine, ethanolamine, cyclohexylamine, morpholine, pyridine, benzylamine, phenylhydrazine, ethylene diamine, and 1,3-propane diamine.

The amount of basic, nitrogen-containing monomer sorbed is related to the number of sulfonic acid groups on the sulfonic acid-containing polymer. That is, the maximum sorption capacity of the sulfonic acid-containing polymer is equal to the mmoles of sulfonic acid groups per gram of the sulfonic acid-containing polymeric material. Typically, at least 0.2 milliequivalents of nitrogen-containing compound per gram of the sulfonic acid-containing polymeric material can be sorbed. In some embodiments, the amount sorbed is in a range of 0.2 to 7 milliequivalents per gram, in a range of 0.2 to 6 milliequivalents per gram, in a range of 0.2 to 5 milliequivalents per gram, in a range of 0.2 to 4.5 milliequivalents per gram, in a range of 0.5 to 4 milliequivalents per gram, in a range of 1 to 4 milliequivalents per gram, in a range of 2 to 4 milliequivalents per gram, or in a range of 3 to 4 milliequivalents per gram of the sulfonic acid-containing polymeric material. Any suitable method can be used to determine the milliequivalents per gram. One suitable method is described in the Example section below.

Any method of sorbing the basic, nitrogen-containing compound of formula Q on the sulfonic acid-containing polymeric material can be used. The method can be used, for example, to determine if there has been exposure to ammonia or another volatile, basic, nitrogen-containing compound. In some embodiments, the sorbing of the basic, nitrogen-containing compound by the sulfonic acid-containing polymer and the subsequent formation of groups of formula —$SO_3^-(QH^+)$ occurs in a sensor component used to detect the presence of absence of the basic, nitrogen-containing compound of formula Q.

The sorbed amount of the basic, nitrogen-containing compound of formula Q can be determined using any suitable analytical method. For example, the sulfonic acid-containing polymeric material that has potentially been exposed to the basic, nitrogen-containing compound can be analyzed for the element nitrogen. In another example, the amount of —$SO_3H$ groups can be determined before and after potential exposure of the sulfonic acid-containing polymeric material to a basic, nitrogen-containing compound. The decrease in moles of —$SO_3H$ groups should be proportional to the moles of basic, nitrogen-containing compound sorbed.

In another aspect, a polymeric material is provided that results from sorption of a basic, nitrogen-containing compound of formula Q on a sulfonic acid-containing polymeric material having at least one —$SO_3H$ group. The resulting polymeric material has at least one group of formula —$SO_3^-$ ($QH^+$). More specifically, this polymeric material comprises an acid-base reaction product of an acid-base reaction mixture containing (a) a sulfonic acid-containing polymeric material having at least one —$SO_3H$ group and (b) a basic, nitrogen-containing compound of formula Q. The sulfonic acid-containing polymeric material comprises a first reaction product of a first reaction mixture containing (i) a precursor polymeric material and (ii) a sulfonyl-containing compound. The precursor polymeric material contains a polymerized product of a polymerizable composition that includes a monomer of Formula (I).

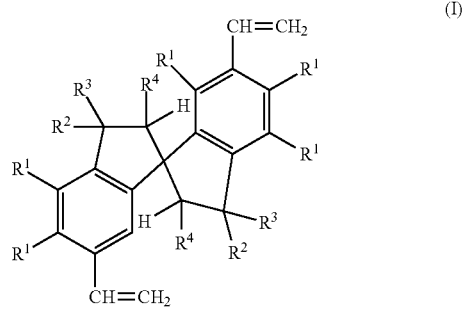

In Formula (I), each $R^1$ is hydrogen, halo, alkyl, aryl, alkaryl, or aralkyl, wherein at least one $R^1$ is hydrogen. Each $R^2$ is independently hydrogen, alkyl, aryl, alkaryl, aralkyl, combines with a $R^3$ connected to a same carbon atom to form a cyclic alkyl, or combines with a $R^3$ connected to the same carbon atom to form a cyclic alkyl that is fused to one or more carbocyclic rings. Each $R^3$ is independently hydrogen, alkyl, aryl, alkaryl, aralkyl, combines with a $R^2$ connected to a same carbon atom to form a cyclic alkyl, combines with a $R^2$ connected to the same carbon atom to form a cyclic alkyl that is fused to one or more carbocyclic rings, or combines with $R^4$ connected to an adjacent carbon atom to form a carbon-carbon bond. Each $R^4$ is independently hydrogen or combines with $R^3$ connected to the adjacent carbon atom to form a carbon-carbon bond.

In this aspect, the polymeric material can have only —$SO_3^-(QH^+)$ groups or can contain a mixture of both —$SO_3H$ groups and —$SO_3^-(QH^+)$ groups. A mixture of —$SO_3H$ groups and —$SO_3^-(QH^+)$ groups will occur if the maximum sorption capacity of the sulfonic acid-containing polymeric material has not been reached. The polymeric material will have only —$SO_3^-(QH^+)$ groups (i.e., no —$SO_3H$ or a non-detectable amount of —$SO_3H$ groups) if the sorption capacity has been reached or nearly reached.

The precursor polymeric material, the sulfonic acid-containing polymeric material, and the polymeric material having —$SO_3^-(QH^+)$ groups are all crosslinked.

Various embodiments are provided of methods of capturing nitrogen-containing compounds and the polymeric material resulting from the capture of nitrogen-containing compounds by sulfonic acid-containing polymeric material.

Embodiment 1 is a method of capturing a nitrogen-containing compound. The method includes providing a sulfonic acid-containing polymeric material having at least one —$SO_3H$ group. The sulfonic acid-containing polymeric material comprises a first reaction product of a first reaction mixture containing (i) a precursor polymeric material and (ii) a sulfonyl-containing compound. The precursor polymeric material comprises a polymerized product of a polymerizable composition that includes a monomer of Formula (I)

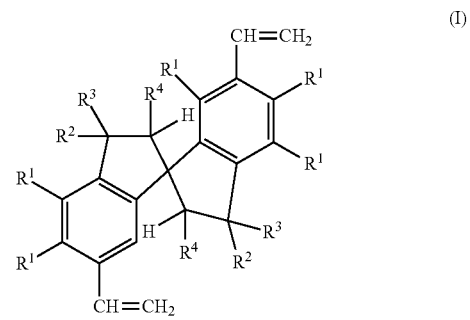

In Formula (I), each $R^1$ is hydrogen, halo, alkyl, aryl, alkaryl, or aralkyl, wherein at least one $R^1$ is hydrogen. Each $R^2$ is independently hydrogen, alkyl, aryl, alkaryl, aralkyl, combines with a $R^3$ connected to a same carbon atom to form a cyclic alkyl, or combines with a $R^3$ connected to the same carbon atom to form a cyclic alkyl that is fused to one or more carbocyclic rings. Each $R^3$ is independently hydrogen, alkyl, aryl, alkaryl, aralkyl, combines with a $R^2$ connected to a same carbon atom to form a cyclic alkyl, combines with a $R^2$ connected to the same carbon atom to form a cyclic alkyl that is fused to one or more carbocyclic rings, or combines with $R^4$ connected to an adjacent carbon atom to form a carbon-carbon bond. Each $R^4$ is independently hydrogen or combines with $R^3$ connected to the adjacent carbon atom to form a carbon-carbon bond. The method further includes sorbing a basic, nitrogen-containing compound of formula Q on the sulfonic acid-containing polymeric material to form a polymeric material having at least one group of formula —$SO_3^-(QH^+)$.

Embodiment 2 is the method of embodiment 1, wherein each $R^1$ is hydrogen or halo.

Embodiment 3 is the method of embodiment 1 or 2, wherein each $R^2$ and each $R^3$ are alkyl.

Embodiment 4 is the method of any one of embodiments 1 to 3, wherein $R^4$ is hydrogen.

Embodiment 5 is the method of any one of embodiments 1 to 4, wherein the compound of Formula (I) is 3,3,3',3'-tetramethyl-1,1'-spirobisindan-6,6'-divinyl.

Embodiment 6 is the method of any one of embodiments 1 to 5, wherein the polymerizable composition further comprises a polyvinyl aromatic monomer or a polyvinyl aromatic monomer substituted with one or more alkyl groups.

Embodiment 7 is the method of embodiment 6, wherein the polyvinyl aromatic monomer is divinylbenzene, trivinylbenzene, divinylbenzene substituted with one or more alkyl groups, or trivinylbezene substituted with one or more alkyl groups.

Embodiment 8 is the method of any one of embodiments 1 to 7, wherein the polymerizable composition optionally further comprises up to 25 weight percent of a mono-vinyl aromatic monomer or a mono-vinyl aromatic monomer substituted with one or more alkyl groups, wherein the weight percent is based on a total weight of monomers in the polymerizable composition.

Embodiment 9 is the method of embodiment 8, wherein the polymerizable composition comprises the 1 to 99 weight percent monomer of Formula (I), 0 to 25 weight percent mono-vinyl aromatic monomer, and 1 to 99 weight percent polyvinyl aromatic monomer, wherein the weight percents are based on a total weight of monomers in the polymerizable composition.

Embodiment 10 is the method of embodiment 9, wherein the polymerizable composition comprises 40 to 99 weight percent monomer of Formula (I), 0 to 15 weight percent mono-vinyl aromatic monomer, and 1 to 60 weight percent polyvinyl aromatic monomer, wherein the weight percents are based on a total weight of monomers in the polymerizable composition.

Embodiment 11 is the method of any one of embodiments 1 to 10, wherein the sulfonic acid-containing polymer is in a form of particles or beads.

Embodiment 12 is the method of any one of embodiments 1 to 11, wherein the sulfonic acid-containing polymeric material is porous.

Embodiment 13 is the method of any one of embodiments 1 to 12, wherein the sulfonic acid-containing polymeric material is microporous, mesoporous, or both.

Embodiment 14 is the method of any one of embodiments 1 to 13, wherein the sulfonic acid-containing polymeric material has the BET surface area equal to at least 50 $m^2$/gram or at least 100 $m^2$/gram.

Embodiment 15 is the method of any one of embodiments 1 to 14, wherein the nitrogen-containing compound has a molecular weight (weight average molecular weight) no greater than 150 grams/mole.

Embodiment 16 is the method of any one of embodiments 1 to 15, wherein the nitrogen-containing compound is ammonia, a hydrazine compound, amine compound, or a nitrogen-containing heterocyclic compound.

Embodiment 17 is the method of any one of embodiments 1 to 16, wherein the nitrogen-containing compound is ammonia, hydrazine, methylhydrazine, methylamine, dimethylamine, trimethylamine, ethylamine, diethylamine, triethylamine, propylamine, dipropylamine, tripropylamine, isopropylamine, diisopropylamine, triisopropylamine, ethanolamine, cyclohexylamine, morpholine, pyridine, benzylamine, phenylhydrazine, ethylene diamine, 1,3-propane diamine, or a mixture thereof.

Embodiment 18 is a polymeric material having at least one group of formula $—SO_3^-(QH^+)$. This polymeric material comprises an acid-base reaction product of an acid-base reaction mixture containing (a) a sulfonic acid-containing polymeric material having at least one $—SO_3H$ group and (b) a basic, nitrogen-containing compound of formula Q. The sulfonic acid-containing polymeric material comprises a first reaction product of a first reaction mixture containing (i) a precursor polymeric material and (ii) a sulfonyl-containing compound. The precursor polymeric material contains a polymerized product of a polymerizable composition that includes a monomer of Formula (I).

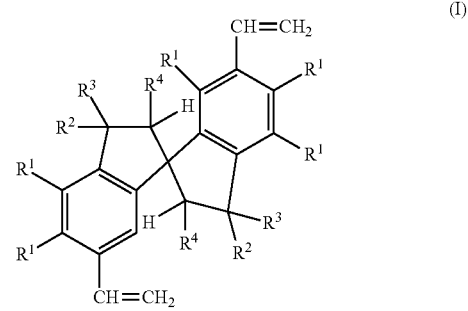

In Formula (I), each $R^1$ is hydrogen, halo, alkyl, aryl, alkaryl, or aralkyl, wherein at least one $R^1$ is hydrogen. Each $R^2$ is independently hydrogen, alkyl, aryl, alkaryl, aralkyl, combines with a $R^3$ connected to a same carbon atom to form a cyclic alkyl, or combines with a $R^3$ connected to the same carbon atom to form a cyclic alkyl that is fused to one or more carbocyclic rings. Each $R^3$ is independently hydrogen, alkyl, aryl, alkaryl, aralkyl, combines with a $R^2$ connected to a same carbon atom to form a cyclic alkyl, combines with a $R^2$ connected to the same carbon atom to form a cyclic alkyl that is fused to one or more carbocyclic rings, or combines with $R^4$ connected to an adjacent carbon atom to form a carbon-carbon bond. Each $R^4$ is independently hydrogen or combines with $R^3$ connected to the adjacent carbon atom to form a carbon-carbon bond.

Embodiment 19 is the polymeric material of embodiment 18, wherein each $R^1$ is hydrogen or halo.

Embodiment 20 is the polymeric material of embodiment 18 or 19, wherein each $R^2$ and each $R^3$ are alkyl.

Embodiment 21 is the polymeric material of any one of embodiments 18 to 20, wherein $R^4$ is hydrogen.

Embodiment 22 is the polymeric material of any one of embodiments 18 to 21, wherein the compound of Formula (I) is 3,3,3',3'-tetramethyl-1,1'-spirobisindan-6,6'-divinyl.

Embodiment 23 is the polymeric material of any one of embodiments 18 to 22, wherein the polymerizable composition further comprises a polyvinyl aromatic monomer or a polyvinyl aromatic monomer substituted with one or more alkyl groups.

Embodiment 24 is the polymeric material of embodiment 23, wherein the polyvinyl aromatic monomer is divinylbenzene, trivinylbenzene, divinylbenzene substituted with one or more alkyl groups, or trivinylbezene substituted with one or more alkyl groups.

Embodiment 25 is the polymeric material of any one of embodiments 18 to 24, wherein the polymerizable composition optionally further comprises up to 25 weight percent of a mono-vinyl aromatic monomer or a mono-vinyl aromatic monomer substituted with one or more alkyl groups, wherein the weight percent is based on a total weight of monomers in the polymerizable composition.

Embodiment 26 is the polymeric material of embodiment 25, wherein the polymerizable composition comprises the 1 to 99 weight percent monomer of Formula (I), 0 to 25 weight percent mono-vinyl aromatic monomer, and 1 to 99 weight percent polyvinyl aromatic monomer, wherein the weight percents are based on a total weight of monomers in the polymerizable composition.

Embodiment 27 is the polymeric material of embodiment 26, wherein the polymerizable composition comprises 40 to 99 weight percent monomer of Formula (I), 0 to 15 weight percent mono-vinyl aromatic monomer, and 1 to 60 weight percent polyvinyl aromatic monomer, wherein the weight percents are based on a total weight of monomers in the polymerizable composition.

Embodiment 28 is the polymeric material of any one of embodiments 18 to 27, wherein the sulfonic acid-containing polymer is in a form of particles or beads.

Embodiment 29 is the polymeric material of any one of embodiments 18 to 28, wherein the sulfonic acid-containing polymeric material is porous.

Embodiment 30 is the polymeric material of any one of embodiments 18 to 29, wherein the sulfonic acid-containing polymeric material is microporous, mesoporous, or both.

Embodiment 31 is the polymeric material of any one of embodiments 18 to 30, wherein the sulfonic acid-containing polymeric material has the BET surface area equal to at least 50 $m^2$/gram or at least 100 $m^2$/gram.

Embodiment 32 is the polymeric material of any one of embodiments 18 to 31, wherein the basic, nitrogen-containing compound has a molecular weight (weight average molecular weight) no greater than 150 grams/mole.

Embodiment 33 is the polymeric material of any one of embodiments 18 to 32, wherein the basic, nitrogen-containing compound is ammonia, a hydrazine compound, amine compound, or a nitrogen-containing heterocyclic compound.

Embodiment 34 is the polymeric material of any one of embodiments 18 to 33, wherein the basic, nitrogen-containing compound is ammonia, hydrazine, methylhydrazine, methylamine, dimethylamine, trimethylamine, ethylamine, diethylamine, triethylamine, propylamine, dipropylamine, tripropylamine, isopropylamine, diisopropylamine, triisopropylamine, ethanolamine, cyclohexylamine, morpholine, pyridine, benzylamine, phenylhydrazine, ethylene diamine, 1,3-propane diamine, or a mixture thereof.

Embodiment 35 is the polymeric material of any one of embodiments 18 to 34, wherein the polymeric material has a mixture of —$SO_3H$ groups and —$SO_3^-(QH^+)$ groups.

EXAMPLES

TABLE 1

List of Materials

| Chemical Name | Chemical Supplier |
|---|---|
| 4,4'-Isopropylidene diphenol | Alfa Aesar, Ward Hill, MA |
| Methane sulfonic acid | Alfa Aesar, Ward Hill, MA |
| Methylene Chloride | EMD Millipore Chemicals, Billerica, MA |
| Methanol | BDH Merck Ltd., Poole Dorset, UK |
| Pyridine | EM Science, Gibbstown, NJ |
| Trifluoromethane sulfonic acid | Oakwood Products, West Columbia, SC |
| Concentrated hydrogen chloride | EMD Millipore Chemicals, Billerica, MA |
| Sodium bicarbonate | J.T. Baker, Phillipsburg, NJ |
| Sodium sulfate | BDH Merck Ltd., Poole Dorset, UK |
| N,N-dimethyl formamide | Sigma-Aldrich, Milwaukee, WI |
| Tributyl(vinyl)tin | Sigma-Aldrich, Milwaukee, WI |
| Lithium chloride | Mallinckrodt, St. Louis, MO |
| Bis(triphenylphosphine)palladium (II) chloride | Sigma-Aldrich, Milwaukee, WI |
| Diethyl ether | EMD Millipore Chemicals, Billerica, MA |
| Potassium fluoride | J.T. Baker, Phillipsburg, NJ |
| Ethyl acetate | EMD Millipore Chemicals, Billerica, MA |
| Petroleum ether | EMD Millipore Chemicals, Billerica, MA |
| Benzoyl peroxide | Sigma-Aldrich, Milwaukee, WI |
| Azoisobutyronitrile | Sigma-Aldrich, Milwaukee, WI |
| Dimethyl 2,2'-azobis(2-methylpropionate) | Wako Pure Chemical Industries, Ltd., Osaka, Japan |
| Methyl ethyl ketone | J.T. Baker, Phillipsburg, NJ |
| Divinylbenzene (80% tech grade) | Sigma-Aldrich, Milwaukee, WI |
| Acetone-D6 | Cambridge Isotope Laboratories, Inc., Andover, MA |
| Chloroform-D | Cambridge Isotope Laboratories, Inc., Andover, MA |
| Chlorosulfonic acid | Alfa Aesar, Ward Hill, MA |
| 1,2-dichloroethane | EMD Millipore Chemicals, Billerica, MA |

Gas Sorption Analysis

Porosity and gas sorption experiments were performed using a Micromeritics Instrument Corporation (Norcross, Ga.) accelerated surface area and porosimetry (ASAP) 2020 system using adsorbates of ultra-high purity. The following is a typical method used for the characterization of the porosity within the exemplified materials. In a Micromeritics half inch diameter sample tube, 50 to 300 milligrams of material was heated at 150° C. under ultra-high vacuum (3 to 7 micrometers Hg) for 2 hours on the analysis port of the ASAP 2020 to remove residual solvent and other adsorbates. Argon sorption isotherms at 77° K were obtained using low pressure dosing (5 $cm^3$/g) at a relative pressure (p/p°) less than 0.1 and a pressure table of linearly spaced pressure points from a relative pressure (p/p°) in a range from 0.1 to 0.98. The method made use of the following equilibrium intervals: 90 seconds at relative pressure (p/p°) less than $10^{-5}$, 40 seconds at relative pressure (p/p°) in a range of $10^{-5}$ to 0.1, and 20 seconds at relative pressure (p/p°) greater than 0.1. Helium was used for the free space determination, after argon sorption analysis, both at ambient temperature and at 77° K. BET specific surface areas ($SA_{BET}$) were calculated from argon adsorption data by multipoint Brunauer-Emmett-Teller (BET) analysis. Apparent micropore distributions were calculated from argon adsorption data by density functional theory (DFT) analysis using the argon at 77° K on carbon slit pores by non-linear density functional theory (NLDFT) model. Total pore volume was calculated from the total amount of argon adsorbed at a relative pressure (p/p°) equal to approximately 0.98. BET, DFT and total pore volume analyses were performed using Micromeritics MicroActive Version 1.01 software.

Elemental Analysis

Samples were analyzed for weight percent carbon, hydrogen and sulfur by combustion using a LECO TruSpec Micro CHNS elemental analyzer (LECO Corp, St. Joseph, Mich.). The samples were run in triplicate or better. Results are reported as the averages of replicate determinations. In order to eliminate ambient water from the analysis, aliquots of each sample were dried on a steam-plate under nitrogen for 2 hours and allowed to cool in a nitrogen purged dry-box for 30 minutes before weighing. The samples were placed in silver capsules and crimped and placed on the auto-sampler in ambient conditions. The LECO TruSpec Micro CHNS instrument was calibrated by first base-lining the instrument with ambient air until the CHNS detectors were stabilized. Next, 3-4 empty crucibles were measured and set as instrument blanks. Finally, a calibration curve was generated with sulfamethazine as a standard. Based on this procedure the standard deviation for each element was: less than +/−0.5 weight percent for carbon, less than +/−0.3 weight percent for hydrogen, less than +/−0.3 weight percent for nitrogen and less than +/−0.3 weight percent for sulfur.

Determination of Acid Equivalents

The sulfonic acid functional polymeric material (about 0.200 grams) was suspended in 20 mL of deionized water. To this suspension was added 1 drop of a 1 percent by weight aqueous solution of phenolphthalein. This suspension was titrated with 0.1 M aqueous NaOH until a persistent pink color remained (phenolphthalein endpoint). The acid equivalents were calculated based on the amount of NaOH needed to reach the titration endpoint.

Ammonia Capacity Test

A simple flow-through custom built delivery system was used to deliver known concentrations of ammonia to the sample for measurement. Stainless steel tubing was used throughout the delivery system Ammonia was delivered to the system from a dry 1% (10,000 ppm) certified ammonia in nitrogen pressurized gas cylinder (Oxygen Service Company, St. Paul, Minn.). The ammonia/nitrogen stream was further diluted with additional nitrogen by use of a series of digital mass flow controllers (available under the trade designation DFC26 from Aalborg, Orangeburg, N.Y.) to deliver a 1000 ppm stream of ammonia at a flow of 50 mL/minute to the testing tube. The digital mass flow controllers were calibrated by placing a Gilibrator-2 Primary Airflow Calibrator (Sensidyne, St. Petersburg, Fla.) at the output of each controller. The Gilibrator flow meter was used to measure a range of flows from each flow controller which was used to generate calibration curves. Using these calibrations curves, the mass flow controllers were set to deliver the desired ammonia concentration at the desired gas flow rate.

The ammonia removal capacity for a material was determined by adding material to a tared test tube until the bed depth in the tube was 0.5 cm after being tamped. The mass of the sample was then determined by weighing the sample in the test tube. The test tube was then connected in line with the system, allowing the 1000 ppm ammonia gas stream to flow through the material. To the downstream side of the test tube, tubing was connected that led to a gas chromatograph instrument (SRI 8610C, SRI Instruments, Torrance, Calif.). At the time the ammonia gas stream began to pass though the test sample, the test was considered started, and a timer was started. The SRI gas chromatograph then periodically sampled the gas stream and passed the sample through a 6'×⅛"×0.085" AT steel Alltech Chromosorb 103 80/100 column (Alltech Associates, Grace Davidson Discovery Sciences, Bannockburn, Ill.). The gas chromatograph instrument was equipped with a 10.6 eV lamp photoionization detector to detect ammonia in the effluent. It was observed that good detection of ammonia vapor was found when the gas chromatograph sampled the gas stream for 20 seconds, allowed the sample to pass through the column for 280 seconds and then allowed 60 seconds to flush out the sample before it drew in the next sample to be analyzed.

Prior to testing, a certified 57 ppm ammonia in nitrogen pressurized gas cylinder (Oxygen Services Company, St. Paul, Minn.) was used to calibrate the gas chromatograph software. The signal generated by this effluent was used to set the software to 50 ppm ammonia. The end point of the ammonia vapor test was defined as the time point at which the ammonia effluent passing through the material produced a signal on the PID detector which exceeded that of the signal calibrated as 50 ppm. Based on the mass of material used and the amount of ammonia delivered to the material over the time required to produce the desired signal signifying the end of the test, the mmoles/gram capacity for ammonia of the material can be calculated.

Preparatory Example 1: Synthesis of 3,3,3',3'-tetramethyl-1,1'-spirobisindan-6,6'-divinyl (SBI-DV)

The monomer 3,3,3',3'-tetramethyl-1,1'-spirobisindan-6,6'-divinyl (SBI-DV) was prepared by first preparing 3,3,3',3'-tetramethyl-1,1'-spirobisindan-6,6'-diol (SBI-diol). The SBI-diol was then converted to perfluoromethane-1-sulfonic acid 6'-(perfluoromethane-1-sulfonyloxy)-3,3,3',3'-tetramethyl-1,1'-spirobisindane-6-yl ester (SBI-bistriflate), which was further converted to the SBI-DV.

Synthesis of 3,3,3',3'-tetramethyl-1,1'-spirobisindan-6,6'-diol (SBI-diol)

In a 5.0 L round bottomed flask, 1000.69 grams (4.38 moles) of 4,4'-isopropylidene diphenol (BPA) was melted. Once all of the BPA was melted, 50.51 grams (0.526 moles) of methane sulfonic acid was slowly added. The reaction mixture was stirred for 3 hours under a nitrogen atmosphere maintaining the temperature of the reaction mixture between 135-150° C. After 3 hours, while still hot, the molten reaction mixture was poured into 2.0 L of deionized water. A brown precipitate formed. The resulting precipitate was isolated by vacuum filtration and washed with 1.5 L of deionized water. The isolated solid was then put back in the 5.0 L round bottomed flask and 1.5 L of methylene chloride ($CH_2Cl_2$) was added. The solid was stirred in the $CH_2Cl_2$ at reflux for one hour. The flask was then allowed to cool to room temperature, and the flask was placed in a refrigerator (about 0° C.) overnight. The solid was then isolated by vacuum filtration and washed with a minimal amount (about 500 mL) of chilled $CH_2Cl_2$. The solid was then placed in a 4.0 L Erlenmeyer flask and dissolved in 900 mL of methanol (MeOH). To this solution was added 190 mL of $CH_2Cl_2$. The solution remained clear. The solution was stirred and 1.1 L of deionized water was added in portions. A white precipitate formed, and the mixture was placed in a refrigerator (about 0° C.) overnight. The solid was isolated by vacuum filtration and washed with a minimal amount (about 300 mL) of chilled $CH_2Cl_2$. The MeOH/$CH_2Cl_2$/$H_2O$ precipitation was repeated once more. The solid from the second precipitation was dried in a vacuum oven at 85° C. overnight to yield 214.77 grams (48% yield) of SBI-diol. $^1$H NMR (500 MHz, acetone-$d_6$) δ 7.85 (s, 2H), 7.02 (d, J=8.1 Hz, 2H), 6.68 (dd, J=8.1, 2.4 Hz, 2H), 6.19 (d, J=2.4 Hz, 2H), 2.32 (d, J=13.0 Hz, 2H), 2.19 (d, J=13.0 Hz, 2H), 1.35 (s, 6H), 1.29 (s, 6H).

Synthesis of perfluoromethane-1-sulfonic acid 6'-(perfluoromethane-1-sulfonyloxy)-3,3,3',3'-tetramethyl-1,1'-spirobisindane-6-yl ester (SBI-bistriflate)

In a 250 mL round bottomed flask, 5.0025 grams (16.2 mmoles) of SBI-diol and 4.755 mL (47.1 mmoles) of pyridine were dissolved in 150 mL of $CH_2Cl_2$. The flask was placed in an ice/water bath. To this solution was added dropwise 7.930 mL (58.8 mmoles) of trifluoromethane sulfonic anhydride (TFMSA). After the addition was complete, the flask was removed from the ice/water bath. The reaction mixture was stirred at room temperature under a nitrogen atmosphere for 1 hour. The reaction was stopped by adding 10 mL of aqueous HCl (10% by weight). The resulting mixture was partitioned between $CH_2Cl_2$ and a saturated aqueous solution of sodium bicarbonate ($NaHCO_3$). The organic layer was isolated, dried over anhydrous sodium sulfate ($Na_2SO_4$) and filtered. The filtrate was condensed under reduced pressure and dried under high vacuum at room temperature for 3 hours to remove any residual pyridine. The resulting tan solid (SBI-bistriflate) weighed 8.51 grams (92% yield). $^1$H NMR (500 MHz, $CDCl_3$) δ 7.17 (d, J=8.3 Hz, 2H), 7.08 (dd, J=8.3, 2.3 Hz, 2H), 6.55 (d, J=2.3 Hz, 2H), 2.26 (ABq, J=13.2 Hz, 4H), 1.34 (s, 6H), 1.29 (s, 6H). $^{19}$F NMR (470.5 MHz, $CDCl_3$) δ −73.0.

Synthesis of 3,3,3',3'-tetramethyl-1,1'-spirobisindan-6,6'-divinyl (SBI-DV)

In a 250 mL round bottomed flask, 5.0025 grams (8.74 mmoles) of SBI-bistriflate was dissolved in 75 mL of anhydrous N,N-dimethyl formamide (DMF). To this solution was added 6.125 mL (21.0 mmoles) of vinyl tributyltin and 22.2225 grams (52.4 mmoles) of lithium chloride (LiCl). The reaction mixture was stirred at room temperature under a nitrogen atmosphere for 5 minutes before adding 0.6140 grams (875 µmoles) of bis(triphenylphosphine) palladium (II) chloride. The reaction mixture was stirred at room temperature overnight under a nitrogen atmosphere. After reacting for 24 hours at room temperature, the reaction was stopped by pouring the reaction mixture into 150 mL of deionized water. A precipitate formed. The aqueous layer and precipitate were extracted with diethyl ether ($Et_2O$) (3×200 mL). The organic layers were combined. The organic layer was then stirred vigorously at room temperature with an equal volume of aqueous potassium fluoride (KF) (10 grams/100 mL) for 1 hour. A gray-white precipitate formed, and the mixture was vacuum filtered. The filtrate was then placed back in a separatory funnel and the organic layer isolated. The organic layer was then dried over anhydrous $Na_2SO_4$, filtered and the filtrate was condensed under reduced pressure to yield a white solid. This solid was further purified by silica gel chromatography. The material was loaded onto a silica gel column (8×25 cm), and the column was eluted with 5% ethyl acetate (EtOAc)/95% petroleum ether (PE) (vol./vol.). Fractions containing the pure SBI-DV were combined, condensed under reduced pressure and dried under high vacuum at room temperature to yield 2.3822 grams (83% yield) of SBI-DV as a white solid. $^1$H NMR (500 MHz, $CDCl_3$) δ 7.34 (dd, J=7.9, 1.6 Hz, 2H), 7.17 (d, J=7.9 Hz, 2H), 6.85 (d, J=1.6 Hz, 2H), 6.64 (dd, J=17.6, 10.9 Hz, 2H), 5.62 (dd, J=17.6, 1.0 Hz, 2H), 5.12 (dd, J=10.9, 1.0 Hz, 2H), 2.32 (ABq, J=13.1 Hz, 4H), 1.42 (s, 6H), 1.36 (s, 6H).

Preparatory Example 2: Homopolymer Formed from SBI-DV

A 0.9 milligrams/mL solution of AIBN was made by dissolving 17.3 milligrams of AIBN in 19.2 mL of EtOAc. In a 20 mL vial, 0.3002 grams (914 µmoles) of SBI-DV was dissolved in 6.0 mL of EtOAc. To this solution was added 2.0 mL of the AIBN/EtOAc solution. The polymerization mixture thus consisted of an EtOAc solution of SBI-DV at 4.0 percent solids and 0.6 weight percent AIBN (based on amount of SBI-DV). The polymerization mixture was bubbled with nitrogen for 10 minutes. The vial was then capped and placed in a sand bath at 90° C. The polymerization was heated at this elevated temperature for 16 hours. A white precipitate had formed and was isolated by vacuum filtration and washed with EtOAc. The solid was placed in a 20 mL vial and 10 mL of EtOAc was added to the vial. The vial was shaken on a wrist shaker for one hour at room temperature. The solid was again isolated by vacuum filtration and washed with EtOAc. The solid was placed in a 20 mL vial and 10 mL of EtOAc was added to the vial. The solid was shaken on a wrist shaker overnight. The solid was again isolated by vacuum filtration and washed with EtOAc. The solid was then dried under high vacuum at 90° C. overnight. This material had a $SA_{BET}$ (surface area calculated using the BET method) of 820.2 m$^2$/gram and total pore volume of 0.619 cm$^3$/gram (p/p°=0.945) as determined by argon sorption.

Preparatory Example 3: Copolymer Formed from SBI-DV and DVB

A 5.0 milligrams/mL solution of benzoyl peroxide (BPO) was made by dissolving 50.1 milligrams of BPO in 10.0 mL of EtOAc. In a 40 mL vial, 0.2003 grams (610 µmoles) of SBI-DV and 261 µL (1.83 mmoles) of DVB (80%, tech grade) was dissolved in 4.33 mL of EtOAc. To this solution was added 1.75 mL of the BPO/EtOAc solution. The polymerization mixture thus consisted of an EtOAc solution of SBI-DV/DVB in a 1:3 molar ratio at 7.4 percent solids and 2 weight percent BPO (based on amount of SBI-DV and DVB). The polymerization mixture was bubbled with nitrogen for 10 minutes. The vial was then capped and placed in a sand bath at 80° C. The polymerization was heated at this elevated temperature for 17 hours. A white precipitate had formed and was isolated by vacuum filtration and washed with EtOAc. The solid was placed in a 20 mL vial and 10 mL of EtOAc was added to the vial. The vial was shaken on a wrist shaker for one hour at room temperature. The solid was again isolated by vacuum filtration and washed with EtOAc. The solid was placed in a 20 mL vial and 10 mL of EtOAc was added to the vial. The solid was shaken on a wrist shaker overnight. The solid was again isolated by vacuum filtration and washed with EtOAc. The solid was then dried under high vacuum at 110° C. overnight. This material also had a $SA_{BET}$ of 788.3 m²/gram and total pore volume of 0.665 cm³/gram (p/p°=0.975) as determined by argon sorption.

Example 1

A chlorosulfonic acid/1,2-dichloroethane (DCE) solution was prepared by adding 2.7 mL of chlorosulfonic acid to 14 mL of DCE which was cooled to 0° C. in an ice/water bath. This solution was added to a 40 mL vial containing 0.2330 grams of the material produced in Preparatory Example 2 (SBI-DV homopolymer) with the vial submerged in a ice/water bath. After 5 minutes at 0° C., the capped vial was removed from the ice bath and placed in a sand bath at 85° C. After 18 hours at this elevated temperature, the reaction was stopped by isolating the solid polymeric material by vacuum filtration. The solid was washed twice with 20 mL of $CH_2Cl_2$. The solid was then placed in a 20 mL vial containing 15 mL of deionized water. The material was allowed to stand in the water at room temperature for 1 hour. The solid was then isolated again by vacuum filtration and washed with water until the pH of the water washes was about 5. The solid was then dried under high vacuum at 80° C. overnight. The acid equivalents of this material, as determined by elemental analysis based on weight percent sulfur, were 4.10 mmoles/gram. The acid equivalents of this material, as measured by liquid titration, were 3.14 mmoles/gram.

The sulfonic acid-containing polymeric material was exposed to ammonia. The ammonia capacity of this material was determined per the ammonia capacity test described above to be 3.02 mmoles/gram. This material also had a $SA_{BET}$ of 832.2 m²/gram and total pore volume of 0.217 cm³/gram (p/p°=0.979) as determined by nitrogen sorption.

Example 2

A chlorosulfonic acid/DCE solution was prepared by adding 2.7 mL of chlorosulfonic acid to 14 mL of DCE which was cooled to 0° C. in an ice/water bath. This solution was added to a 40 mL vial containing 0.2129 grams of the material produced in Preparatory Example 3 (SBI-DV/DVB 1:3 molar ratio copolymer) with the vial submerged in a ice/water bath. After 5 minutes at 0° C., the capped vial was removed from the ice bath and placed in a sand bath at 85° C. After 18 hours at this elevated temperature, the reaction was stopped by isolating the solid polymeric material by vacuum filtration. The solid was washed twice with 20 mL of $CH_2Cl_2$. The solid was then placed in a 20 mL vial containing 15 mL of deionized water. The material was allowed to stand in the water at room temperature for 1 hour. The solid was then isolated again by vacuum filtration and washed with water until the pH of the water washes was about 5. The solid was then dried under high vacuum at 80° C. overnight. The acid equivalents of this material, as determined by elemental analysis based on weight percent sulfur, were 3.95 mmoles/gram. The acid equivalents of this material, as measured by liquid titration, were 3.57 mmoles/gram. This material had a $SA_{BET}$ of 494.1 m²/gram and total pore volume of 0.416 cm³/gram (p/p°=0.979) as determined by argon sorption.

The sulfonic acid-containing polymeric material was exposed to ammonia. The ammonia capacity of this material was determined per the ammonia capacity test described above to be 2.99 mmoles/gram.

I claim:
1. A method of capturing a nitrogen-containing compound, the method comprising:
   a) providing a sulfonic acid-containing polymeric material having at least one —$SO_2OH$ group, the sulfonic acid-containing polymeric material comprising a first reaction product of a first reaction mixture comprising:
      i) a precursor polymeric material comprising a polymerized product of a polymerizable composition comprising a monomer of Formula (I)

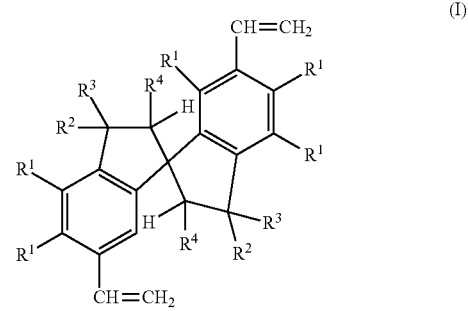

wherein
   each $R^1$ is hydrogen, halo, alkyl, aryl, alkaryl, or aralkyl, wherein at least one R1 is hydrogen;
   each $R^2$ is independently hydrogen, alkyl, aryl, alkaryl, aralkyl, combines with a $R^3$ connected to a same carbon atom to form a cyclic alkyl, or combines with a $R^3$ connected to the same carbon atom to form a cyclic alkyl that is fused to one or more carbocyclic rings;
   each $R^3$ is independently hydrogen, alkyl, aryl, alkaryl, aralkyl, combines with a $R^2$ connected to a same carbon atom to form a cyclic alkyl, combines with a $R^2$ connected to the same carbon atom to form a cyclic alkyl that is fused to one or more carbocyclic rings, or combines with $R^4$ connected to an adjacent carbon atom to form a carbon-carbon bond; and
   each $R^4$ is independently hydrogen or combines with $R^3$ connected to the adjacent carbon atom to form a carbon-carbon bond; and
      ii) a sulfonyl-containing compound; and
   b) sorbing vapors of a basic, nitrogen-containing compound on the sulfonic acid-containing polymeric material to form a nitrogen containing polymeric material.
2. The method of claim 1, wherein the basic, nitrogen-containing compound has a molecular weight (weight average molecular weight) no greater than 150 grams/mole.
3. The method of claim 1, wherein the basic, nitrogen-containing compound is ammonia, a hydrazine compound, amine compound, or a nitrogen-containing heterocyclic compound.
4. A nitrogen containing polymeric material comprising an acid-base reaction product of an acid-base reaction mixture comprising:
   a) a sulfonic acid-containing polymeric material having at least one —$SO_3H$ group, the sulfonic acid-containing polymeric material comprising a first reaction product of a first reaction mixture comprising:
      i) a precursor polymeric material comprising a polymerized product of a polymerizable composition comprising a monomer of Formula (I)

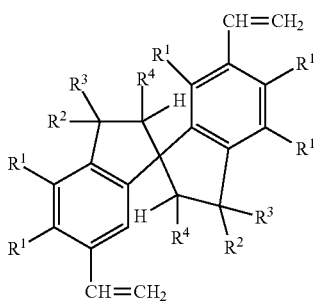

(I)

wherein
- each $R^1$ is hydrogen, halo, alkyl, aryl, alkaryl, or aralkyl, wherein at least one R1 is hydrogen;
- each $R^2$ is independently hydrogen, alkyl, aryl, alkaryl, aralkyl, combines with a $R^3$ connected to a same carbon atom to form a cyclic alkyl, or combines with a $R^3$ connected to the same carbon atom to form a cyclic alkyl that is fused to one or more carbocyclic rings;
- each $R^3$ is independently hydrogen, alkyl, aryl, alkaryl, aralkyl, combines with a $R^2$ connected to a same carbon atom to form a cyclic alkyl, combines with a $R^2$ connected to the same carbon atom to form a cyclic alkyl that is fused to one or more carbocyclic rings, or combines with $R^4$ connected to an adjacent carbon atom to form a carbon-carbon bond; and
- each $R^4$ is independently hydrogen or combines with $R^3$ connected to the adjacent carbon atom to form a carbon-carbon bond; and ii) a sulfonyl-containing compound; and b) a basic, nitrogen-containing compound.

5. The nitrogen containing polymeric material of claim 4, wherein each $R^2$ and each $R^3$ are alkyl.

6. The nitrogen containing polymeric material of claim 4, wherein $R^4$ is hydrogen.

7. The nitrogen containing polymeric material of claim 4, wherein the compound of Formula (I) is 3,3,3',3'-tetramethyl-1,1'-spirobisindan-6,6'-divinyl.

8. The nitrogen containing polymeric material of claim 4, wherein the polymerizable composition further comprises a polyvinyl aromatic monomer or a polyvinyl aromatic monomer substituted with one or more alkyl groups.

9. The nitrogen containing polymeric material of claim 4, wherein the polymerizable composition optionally further comprises up to 25 weight percent of a monovinyl aromatic monomer or a mono-vinyl aromatic monomer substituted with one or more alkyl groups, wherein the weight percent is based on a total weight of monomers in the polymerizable composition.

10. The nitrogen containing polymeric material of claim 9, wherein the polymerizable composition comprises the 1 to 99 weight percent monomer of Formula (I), 0 to 25 weight percent monovinyl aromatic monomer, and 1 to 99 weight percent polyvinyl aromatic monomer, wherein the weight percents are based on a total weight of monomers in the polymerizable composition.

11. The nitrogen containing polymeric material of claim 4, wherein the sulfonic acid-containing polymeric material is in a form of particles or beads.

12. The nitrogen containing polymeric material of claim 4 is porous.

13. The nitrogen containing polymeric material of claim 4, wherein the sulfonic acid-containing polymeric material has the BET surface area equal to at least 50 $m^2$/gram.

14. The nitrogen containing polymeric material of claim 4, wherein the basic, nitrogen-containing compound has a molecular weight (weight average molecular weight) no greater than 150 grams/mole.

15. The nitrogen containing polymeric material of claim 4, wherein the basic, nitrogen-containing compound is ammonia, a hydrazine compound, amine compound, or a nitrogen-containing heterocyclic compound.

* * * * *

UNITED STATES PATENT AND TRADEMARK OFFICE
CERTIFICATE OF CORRECTION

PATENT NO. : 10,220,370 B2  
APPLICATION NO. : 15/312712  
DATED : March 5, 2019  
INVENTOR(S) : Wendland Page 1 of 3

It is certified that error appears in the above-identified patent and that said Letters Patent is hereby corrected as shown below:

In the Specification

Column 2,

Line 32, delete " 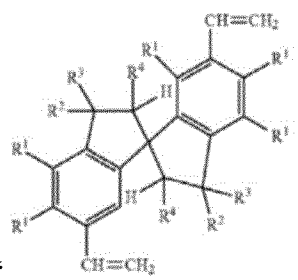 " and insert -- 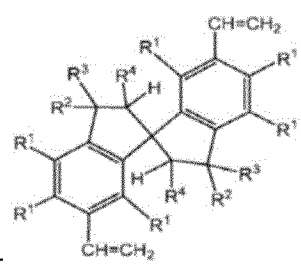 --, therefor.

Column 3,

Line 12, delete " 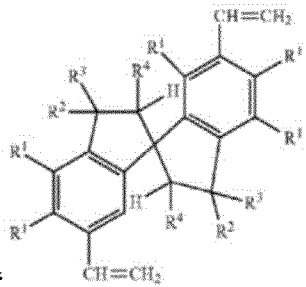 " and insert -- 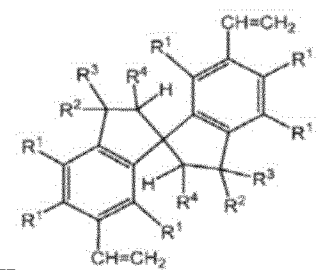 --, therefor.

Column 4,  
Line 37, Delete ""mircopores"" and insert -- "micropores" --, therefor.

Signed and Sealed this  
Twenty-second Day of October, 2019

Andrei Iancu  
*Director of the United States Patent and Trademark Office*

Column 5,

Line 2, delete " 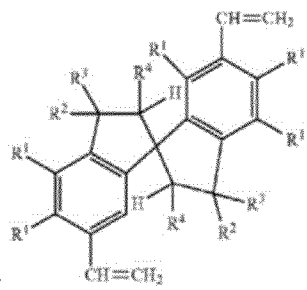 " and insert -- 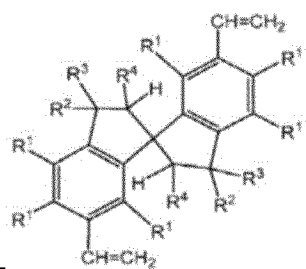 --, therefor.

Column 12,
Line 50, delete "(2-methylproprionate))," and insert -- (2-methylpropionate)), --, therefor.

Column 16,
Line 7, delete "milliquivalents" and insert -- milliequivalents --, therefor.
Line 64, delete "milliquivalents" and insert -- milliequivalents --, therefor.

Column 17,

Line 42, delete " 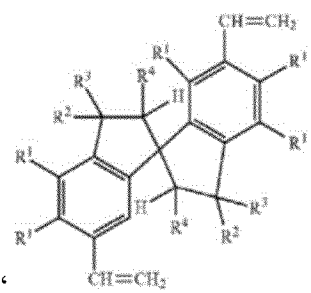 " and insert -- 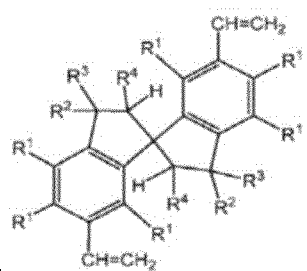 --, therefor.

Column 18,
Line 30, delete "(I)" and insert -- (I). --, therefor.

Line 34, delete " 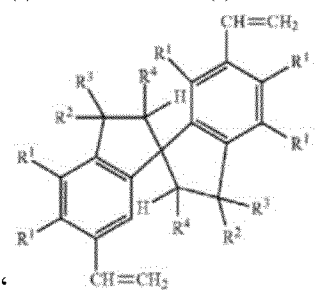 " and insert -- 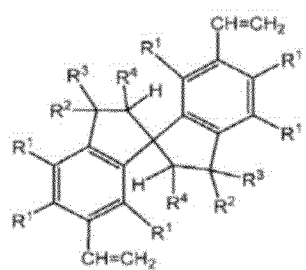 --, therefor.

Column 19,
Line 17, delete "trivinylbezene" and insert -- trivinylbenzene --, therefor.

CERTIFICATE OF CORRECTION (continued)
U.S. Pat. No. 10,220,370 B2

Column 20,

Line 18, delete " 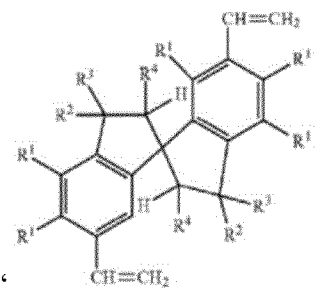 " and insert -- 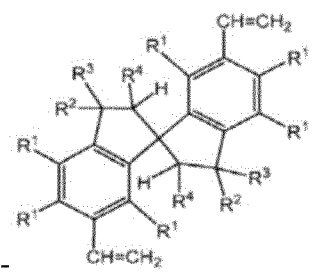 --, therefor.
Line 63, delete "trivinylbezene" and insert -- trivinylbenzene --, therefor.

In the Claims

Column 28,

Line 14, in Claim 1, delete " 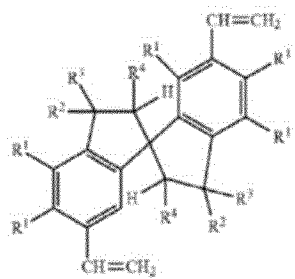 " and insert -- 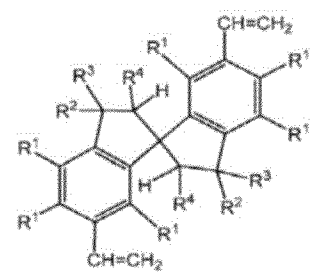 --, therefor.

Column 29,

Line 2, in Claim 4, delete " 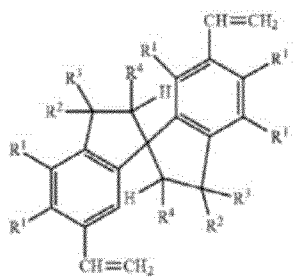 " and insert -- 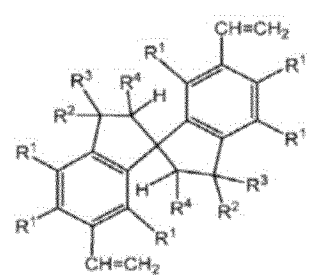 --, therefor.

Column 30,
Line 11, in Claim 9, delete "mono-vinyl" and insert -- monovinyl --, therefor.